United States Patent
Kasai

(10) Patent No.: US 9,531,958 B2
(45) Date of Patent: Dec. 27, 2016

(54) IMAGE PROCESSING DEVICE, IMAGING DEVICE, IMAGE PROCESSING METHOD, AND PROGRAM HAVING DIFFERENT EXPOSURE START TIMES

(75) Inventor: Masanori Kasai, Kanagawa (JP)

(73) Assignee: Sony Semiconductor SolutionsCorporation, Kanagawa (JP)

( * ) Notice: Subject to any disclaimer, the term of this patent is extended or adjusted under 35 U.S.C. 154(b) by 255 days.

(21) Appl. No.: 13/883,696

(22) PCT Filed: Oct. 24, 2011

(86) PCT No.: PCT/JP2011/074467
§ 371 (c)(1),
(2), (4) Date: May 6, 2013

(87) PCT Pub. No.: WO2012/063634
PCT Pub. Date: May 18, 2012

(65) Prior Publication Data
US 2013/0242152 A1    Sep. 19, 2013

(30) Foreign Application Priority Data
Nov. 12, 2010    (JP) ................................ 2010-254291

(51) Int. Cl.
H04N 5/228    (2006.01)
H04N 5/235    (2006.01)
(Continued)

(52) U.S. Cl.
CPC .......... *H04N 5/2353* (2013.01); *H04N 5/3458* (2013.01); *H04N 5/3535* (2013.01);
(Continued)

(58) Field of Classification Search
CPC .. H04N 5/35536; H04N 5/2355; H04N 5/355; H04N 5/35581
(Continued)

(56) References Cited

U.S. PATENT DOCUMENTS

2007/0097225 A1*    5/2007    Sato et al. ................. 348/222.1
2007/0273785 A1    11/2007    Ogawa et al.
(Continued)

FOREIGN PATENT DOCUMENTS

EP    2 031 880 A1    3/2009
JP    06-141229    5/1994
(Continued)

OTHER PUBLICATIONS

Japanese Office Action dated May 27, 2014 issued in Japanese Patent Application No. 2010-254291 (5 pages).
(Continued)

*Primary Examiner* — Sinh Tran
*Assistant Examiner* — Selam T Gebriel
(74) *Attorney, Agent, or Firm* — Sheridan Ross P.C.

(57) ABSTRACT

A device and method are provided to generate an image with a wide dynamic range, based on one photographed image. An exposure time control is executed in which different exposure times are set in units of rows of a pixel portion, in units of pixel regions, or similar, and different, multiple pixel information which are the pixel values of the pixels set with different exposures are obtained. For example, high sensitivity pixel information is obtained from long exposure pixels, low sensitivity information is obtained from short exposure pixels, and a pixel value for the output image is calculated based on the pixel information with these different sensitivities. For example, for high luminosity regions, the sensitivity pixel information may have a saturated value, and so a large weight is set to the low sensitivity pixel information, also for low luminosity regions, the SN ratio of low sensitivity pixel information is estimated to be poor, and so a large weight is set to the high sensitivity pixel information to determine the output pixel value.

21 Claims, 21 Drawing Sheets

(51) Int. Cl.
  *H04N 5/345* (2011.01)
  *H04N 5/353* (2011.01)
  *H04N 5/355* (2011.01)
  *H04N 9/04* (2006.01)

(52) U.S. Cl.
  CPC ..... *H04N 5/35554* (2013.01); *H04N 5/35581* (2013.01); *H04N 5/2351* (2013.01); *H04N 9/045* (2013.01); *H04N 2209/045* (2013.01)

(58) Field of Classification Search
  USPC .............................................. 348/221.1, 362
  See application file for complete search history.

(56) References Cited

U.S. PATENT DOCUMENTS

| | | | |
|---|---|---|---|
| 2008/0143841 A1 | 6/2008 | Tico et al. | |
| 2009/0059048 A1* | 3/2009 | Luo et al. | 348/308 |
| 2009/0091645 A1 | 4/2009 | Trimeche et al. | |
| 2010/0309333 A1* | 12/2010 | Smith et al. | 348/230.1 |

FOREIGN PATENT DOCUMENTS

| | | |
|---|---|---|
| JP | H06-141229 | 5/1994 |
| JP | 2000-050151 | 2/2000 |
| JP | 2000-069491 | 3/2000 |
| JP | 2000-350222 | 12/2000 |
| JP | 2007-235656 | 9/2007 |
| JP | 2008-099158 | 4/2008 |
| WO | WO 2006-049098 | 5/2006 |
| WO | WO 2006/049098 A1 | 5/2006 |

OTHER PUBLICATIONS

Extended European Search Report of European Patent Application No. 11839426.1-1902 dated Apr. 4, 2014 (5 pages).

English Language International Search Report in corresponding PCT/JP2005/019889, mailed Feb. 7, 2006.

Japanese Office Action of Japanese Patent Application No. 2010-254291 dated Feb. 10, 2015 (3 pages).

* cited by examiner

FIG. 9

(1) CALCULATION EXAMPLE IN VERTICAL DIRECTION (S11)

OUTPUT: Gb(1) = [(HIGH SENSITIVITY INFORMATION (Gb (0, 0)) × $W_H$)] + [(LOW SENSITIVITY INFORMATION (Gb (0,1)) × (GAIN) × $W_L$)]

WHERE GAIN IS A NUMBER FOR COMPENSATING SENSITIVITY (EXISTING VALUE)

$W_H$ AND $W_L$ ARE WEIGHTS

|  | LOW SENSITIVITY INFORMATION [10 bit (0 – 1023) OUTPUT] | | |
| --- | --- | --- | --- |
|  | 0 ≤ data < 50 | 50 ≤ data < 100 | 100 ≤ data < 1023 |
| $W_H$ | 1.0 | 0.5 | 0 |
| $W_L$ | 0 | 0.5 | 1.0 |

(2) CALCULATION EXAMPLE IN HORIZONTAL DIRECTION (S12)

OUTPUT: Gb (out) = [Gb (1) × 0.5] + [Gb (2) × 0.5]

FIG. 21

CONFIGURATION EXAMPLE OF PIXEL PORTION

| W | B | W | R | W | B | W | R |
|---|---|---|---|---|---|---|---|
| G | W | G | W | G | W | G | W |
| B | W | R | W | B | W | R | W |
| W | G | W | G | W | G | W | G |
| W | R | W | B | W | R | W | B |
| G | W | G | W | G | W | G | W |
| B | W | R | W | B | W | R | W |
| W | G | W | G | W | G | W | G |

HIGH SENSITIVITY | LOW SENSITIVITY | HIGH SENSITIVITY | LOW SENSITIVITY

IMAGE PROCESSING DEVICE, IMAGING DEVICE, IMAGE PROCESSING METHOD, AND PROGRAM HAVING DIFFERENT EXPOSURE START TIMES

TECHNICAL FIELD

The present invention relates to an image processing device, an imaging device, an image processing method, and a program. It particularly relates to an image processing device, an imaging device, an image processing method, and a program which generates images with a wide dynamic range.

BACKGROUND ART

Solid-state imaging elements, such as CCD image sensors and CMOS (Complementary Metal Oxide Semiconductor) image sensors used in video cameras, digital still cameras, and such, accumulate electrical charges corresponding to an amount of incident light, and perform photoelectric conversion to output electrical signals corresponding to the accumulated electrical charge. However, there is a limit to the amount of electrical charge that may be accumulated in the photoelectrical conversion elements, and if an amount of light over a certain amount is received, the accumulated electrical charge amount approaches a saturated level, and if a photographic subject region has a brightness that is over a certain amount, a so-called whiteout condition occurs in those regions where a luminosity level has become saturated.

In order to prevent this kind of phenomenon, an electrical charge accumulation period for the photoelectric conversion elements is controlled corresponding to changes in external light and similar, exposure periods are adjusted, and processing is performed to control sensitivity to an optimum value. For example, for a bright photographic subject, by cutting a shutter at high speed, the exposure period is shortened, and the photoelectric accumulation period for the photoelectric conversion elements is shortened to cause an electrical signal to be output before the accumulated charge reaches the saturation level. With this kind of processing, images in which their gradation is correctly reproduced corresponding to the photographic subject may be output.

However, for the photographing of photographic subjects with both bright and dark areas, if the shutter is cut at a high speed, the exposure period is not long enough for the dark areas, which results in S/N degradation and loss of image quality. For photographic images of photographic subjects with both bright and dark areas, it is necessary to realize a high S/N with a long exposure period for pixels on the image sensor which have a small amount of incident light, and to perform processing to avoid saturation for pixels which have a large amount of incident light in order to correctly reproduce both the bright areas and the dark areas.

As a method to realize this kind of processing, a method to combine multiple images photographed consecutively with different exposure times is known. That is to say, this is a method to generate one image in which long exposure images and short exposure images are consecutively photographed individually, and by a combination processing in which the long exposure images are used for the dark image regions, and the short exposure images are used for the bright image regions which would have whiteout in the long exposure images. In this way, by combining multiple, different exposure images, images with no whiteout and a wide dynamic range may be obtained.

For example, PTL 1 (Japanese Unexamined Patent Application Publication No. 2008-99158) discloses a configuration to obtain images with a wide dynamic range by combining multiple images with different exposure amounts. This processing will be described with reference to FIG. 1. Regarding shooting moving images, an imaging device, for example, outputs image data with two different exposure times within a video rate (30-60 fps). Also, regarding shooting still images, image data with two different exposure times is generated and output. FIG. 1 is a diagram describing properties of images with two different exposure times generated by the imaging device (long exposure image and short exposure image). The horizontal axis is time (t), and the vertical axis is an accumulated electrical charge amount (e) for a light-receiving photodiode (PD) that configures a photoelectric conversion element corresponding to one pixel of a solid-state imaging element.

For example, when the incident light amount of the light-receiving photodiode (PD) is large, that is to say when handling a bright photographic subject, as represented by a high luminosity region 11 as illustrated in FIG. 1, the electrical charge accumulation amount rapidly increases along with the elapsed time. In contrast, when the incident light amount of the light-receiving photodiode (PD) is small, that is to say when handling a dark photographic subject, as represented by a low luminosity region 12 as illustrated in FIG. 1, the electrical charge accumulation amount rises mildly along with the elapsed time.

Timings t0 through t3 are equivalent to an exposure time TL for obtaining long exposure images. For the line representing the low luminosity region 12 as this long exposure time TL, the electrical charge accumulation amount does not reach a saturation level at the timing t3 (non-saturation point Py), and a correct gradation expression may be obtained by using an electrical signal obtained based on this electrical charge accumulation amount (Sa) to determine a gradation level of the pixel.

However, it is obvious that the electrical charge accumulation amount for the line representing the high luminosity region 11 has already reached the saturation level (saturation point Px) before the timing t3. Therefore, from this kind of high luminosity region 11, only pixel values corresponding to electrical signals at a saturation level may be obtained from the long exposure images, and as a result pixels will whiteout.

Thus, at this kind of high luminosity region 11, for the time before leading up to the timing t3, for example the timing t1 illustrated in the diagram (electrical discharge start point P1), first the electrical charge from the light-receiving photodiode (PD) will be discharged. The electrical charge discharged is not the entire electrical charge accumulated in the light-receiving photodiode (PD), but only the intermediate voltage retaining level that is controllable for the photodiode (PD). After this electrical charge discharge processing, a short exposure executes again, which is an exposure time TS (t2 through t3). That is to say, a short exposure will be performed during a period from a short exposure start point P2 to a short exposure end point P3 as illustrated in the figure. An electrical charge accumulation amount (Sb) may be obtained by this short exposure, and the pixel gradation level is determined based on the electrical signal obtained based on this electrical charge accumulation amount (Sb).

Further, when determining pixel values based on the electrical signal based on the electrical charge accumulation amount (Sa) obtained by the long exposure for the low luminosity region 12 and the electrical signal based on the electrical signal based on the electrical charge accumulation amount (Sb) obtained by the short exposure for a high luminosity region 251, an electrical signal output value is calculated corresponding to an estimated electrical charge accumulation amount when equal time exposure is performed or this estimated electrical charge accumulation amount, and a pixel value level is determined based on the calculation result.

In this way, by combining short exposure images and long exposure images, images with no whiteout that have a wide dynamic range may be obtained.

Further, PTL 2 (Japanese Unexamined Patent Application Publication No. 2000-50151) discloses a configuration similar to the configuration described in PTL 1 in which multiple images with different exposure amounts are photographed, and during the combination processing, the multiple images with different exposure amounts are compared, and a pixel region that contains movement is identified, and a correction is performed to control the generation of false color that accompanies the combination.

However, the configurations described in the PTLs 1 and 2 described previously have to perform processing to photograph and combine long exposure images and short exposure images separately at some point. To perform this processing, there has to be enough frame memory to store at least one image worth of data, which has been a problem that has led to increased costs. Also, the DSP (Digital Signal Processor) that performs the image processing has to perform processing in which data for two images with different exposure times are input. As a result, this required a processor with advanced functionality, and this point has also been a problem which has led to increased camera costs.

Also, as the photographing of at least two images has to be executed, there is a problem in which too much time has to be taken for the photographing time and the processing time. Also, when the photographic subjects move and movement occurs during the period when photographing the two images, this causes a problem in that good image combination cannot be performed, and this lowers the quality of the combined image output.

CITATION LIST

Patent Literature

PTL 1: Japanese Unexamined Patent Application Publication No. 2008-99158
PTL 2: Japanese Unexamined Patent Application Publication No. 2000-50151

SUMMARY OF INVENTION

Technical Problem

It is an object of the present invention to provide an image processing device, an imaging device, an image processing method, and a program with the previously described problem taken into consideration, without separately photographing images with different exposure times, but which can rather generate images with a wide dynamic range using an image photographed one time, for example.

Solution to Problem

A first aspect of the present invention is an image processing device that includes a control unit for executing an exposure time control of pixels and units of pixel regions, a pixel portion for outputting pixel information of multiple different exposure times by an imaging processing under control of the control unit, and a pixel information combining unit for calculating pixel values of output images by inputting the pixel information with multiple different exposure times output from the pixel portion and executing calculation processing using this multiple pixel information.

Further, regarding an embodiment of the image processing device of the present invention, the control unit executes the exposure time control in units of rows of the pixel portion, the pixel portion outputs pixel information with different exposure times from multiple, different rows, the pixel information combining unit calculates a pixel value for one pixel of an output image from one pixel by the calculation processing that uses the multiple pixel information input from the multiple, different rows.

Further, regarding an embodiment of the image processing device of the present invention, the pixel portion outputs high sensitivity pixel information from long exposure regions, and outputs low sensitivity pixel information from short exposure regions, and wherein, in the calculation processing of the pixel value of the output image, the pixel information combining unit executes an addition processing to set a weight corresponding to the brightness of the photographic subject corresponding to the high sensitivity pixel information input from the long exposure regions and the low sensitivity pixel information input from the short exposure regions.

Further, regarding an embodiment of the image processing device of the present invention, when the high sensitivity pixel information input from the long exposure regions is at or above a predetermined threshold, the pixel information combining unit calculates the pixel value of the output image by calculation processing by setting the weight of the high sensitivity pixel information to zero or a small number, and using only the low sensitivity pixel information input from the short exposure regions, or setting the weight thereof to a great number.

Further, regarding an embodiment of the image processing device of the present invention, when the low sensitivity pixel information input from the short exposure regions is below a predetermined threshold, the pixel information combining unit calculates the pixel value of the output image by calculation processing by setting the weight of the low sensitivity pixel information to zero or a small number, and using only the high sensitivity pixel information input from the long exposure regions, or setting the weight thereof to a great number.

Further, regarding an embodiment of the image processing device of the present invention, when the low sensitivity pixel information input from the short exposure regions is at or above a predetermined threshold, the pixel information combining unit calculates the pixel value of the output image by calculation processing by setting the weight of the high sensitivity pixel information input from the long exposure regions to zero or a small number, and using only the low sensitivity pixel information input from the short exposure regions, or setting the weight thereof to a great number.

Further, regarding an embodiment of the image processing device of the present invention, the control unit executes the exposure time control to set the long exposure regions and the short exposure regions in units of two rows of the pixel portion, the pixel portion outputs at least one or more pixel information from each of the long exposure regions and the short exposure regions, and the pixel information combining unit calculates the pixel value for the output image from one pixel by calculation processing using at least one or more pixel information input from both the high sensitivity pixel information input from the long exposure regions and the low sensitivity pixel information input from the short exposure regions.

Further, regarding an embodiment of the image processing device of the present invention, the control unit executes the exposure time control at units of rows by shutter control at units of rows of the pixel portion.

Further, regarding an embodiment of the image processing device of the present invention, the control unit executes the exposure time control at units of color by shutter control at units of color of the pixel portion.

Further, regarding an embodiment of the image processing device of the present invention, the image processing device further includes a counter for counting a digital value equivalent to the pixel value for the high sensitivity pixel of the long exposure regions output from the pixel portion, and an output selection unit to select and output the pixel value for this high sensitivity pixel as the calculation pixel value of the output image when the pixel value for the high sensitivity pixel counted by the counter is below a predetermined threshold, and to select and output the pixel value for the low sensitivity pixel of the short exposure region that is the same color as this high sensitivity pixel as the calculation pixel value of the output image when the pixel value for the high sensitivity pixel counted by the counter is at or above a predetermined threshold.

Further, regarding an embodiment of the image processing device of the present invention, the pixel portion outputs the high sensitivity pixel information from the long exposure regions, outputs the low sensitivity pixel information from the short exposure regions, and outputs a medium sensitivity pixel information from medium exposure regions, which have exposure times between the long exposures and the short exposures, and regarding the calculation processing of the pixel value for the output image, the pixel information combining unit calculates the pixel value for the output image by executing calculation processing to set the weight corresponding to the brightness of the photographic subject to the high sensitivity pixel information, the low sensitivity pixel information, and the medium sensitivity pixel information.

Further, regarding an embodiment of the image processing device of the present invention, the image processing device further includes a gradation conversion unit for executing bit reduction processing of the pixel value for the output image of each pixel generated by the pixel information combining unit.

Further, regarding an embodiment of the image processing device of the present invention, the image processing device further includes a signal processing unit for executing signal processing on the output images generated from the pixel information combining unit.

Further, regarding an embodiment of the image processing device of the present invention, the image processing device further includes a codec for executing encoding processing on output images generated by the pixel information combining unit.

Further, regarding an embodiment of the image processing device of the present invention, the pixel portion has a configuration in which the pixel information with different exposure times of the same color is output from pixel regions that are at least 3×3 pixels.

Further, regarding an embodiment of the image processing device of the present invention, the pixel portion includes a Bayer array or an RGBW array.

Further, a second aspect of the present invention is an imaging device that includes an imaging unit, and an image processing unit for executing the processing according to any one of Claims 1 through 16.

Further, a third aspect of the present invention is an image processing method executed by the image processing device, including a control step in which the control unit executes an exposure time control of pixels or at units of pixel regions, a pixel information output step in which the pixel portion outputs pixel information with multiple, different exposure times by an imaging processing under control of the control unit, and a pixel information combining step in which the pixel information combining unit calculates pixel values of output images by inputting the pixel information with multiple different exposure times output from the pixel portion and executes calculation processing using this multiple pixel information.

Further, a fourth aspect of the present invention is a program for executing the image processing in the image processing device, including a control step in which the control unit executes an exposure time control of pixels or at units of pixel regions, a pixel information output step in which the pixel portion outputs pixel information with multiple, different exposure times by an imaging processing under control of the control unit, and a pixel information combining step in which the pixel information combining unit calculates pixel values of output images by inputting the pixel information with multiple different exposure times output from the pixel portion and executes calculation processing using this multiple pixel information.

Further, the program of the present invention may be, for example, supplied via a network medium, or a recording medium that supplies the program in a computer-readable format for an information processing device or computer system that may execute various program code. By supplying this kind of program in a computer-readable format, the processing corresponding to the program may be realized on an information processing device or computer system.

Other objects, features, and advantages of the present invention will be described in more detail based on the attached figures and the embodiments described later. Further, the system in the present specification is a logical grouped configuration of multiple devices, and each device configuration is not limited to being within the same physical device.

Advantageous Effects of Invention

According to the configuration of an embodiment of the present invention, a device and method are realized to generate an image with a wide dynamic range based on one photographed image. Specifically, an exposure time control is executed to set different exposure times in units of rows of a pixel portion or in units of pixel regions, and multiple, different pixel information, which are pixel values of pixels that have different exposure times set, is obtained. For example, high sensitivity pixel information from long exposure pixels and low sensitivity pixel information from short exposure pixels is obtained, and a pixel value for an output image based on the pixel information with these different sensitivities is calculated. For example, high luminosity regions have a potential for sensitivity pixel information to have a saturated value, and so a weight for the low sensitivity pixel information is set to a large number, and also low luminosity regions are estimated to have low sensitivity pixel information with a poor SN ratio, and so an weight fox the high sensitivity pixel information is set to a large number to determine an output pixel value.

The generation of an image with a wide dynamic range based on one photographed image is realized by this processing.

BRIEF DESCRIPTION OF DRAWINGS

FIG. 9 is a diagram describing an example of an output pixel determining algorithm of the pixel information combining unit for the imaging device of the image processing device related to the first Embodiment of the present invention.

FIG. 21 is a diagram describing a configuration for the imaging device of the image processing device related to an eighth Embodiment of the present invention.

DESCRIPTION OF EMBODIMENTS

The following will describe an image processing device, an imaging device, an image processing method, and a program of the present invention with reference to the drawings. The descriptions will be performed in the following item order.
1. Overall configuration examples of the image processing device
2. Embodiments of specific configurations and processing of the image processing device
(2-1. First Embodiment)
    through
(2-8. Eighth Embodiment)

1. Overall Configuration Examples of the Image Processing Device

First, the overall configuration examples for the image processing device of the present invention will be described with reference to FIG. 2.

Figure 1:
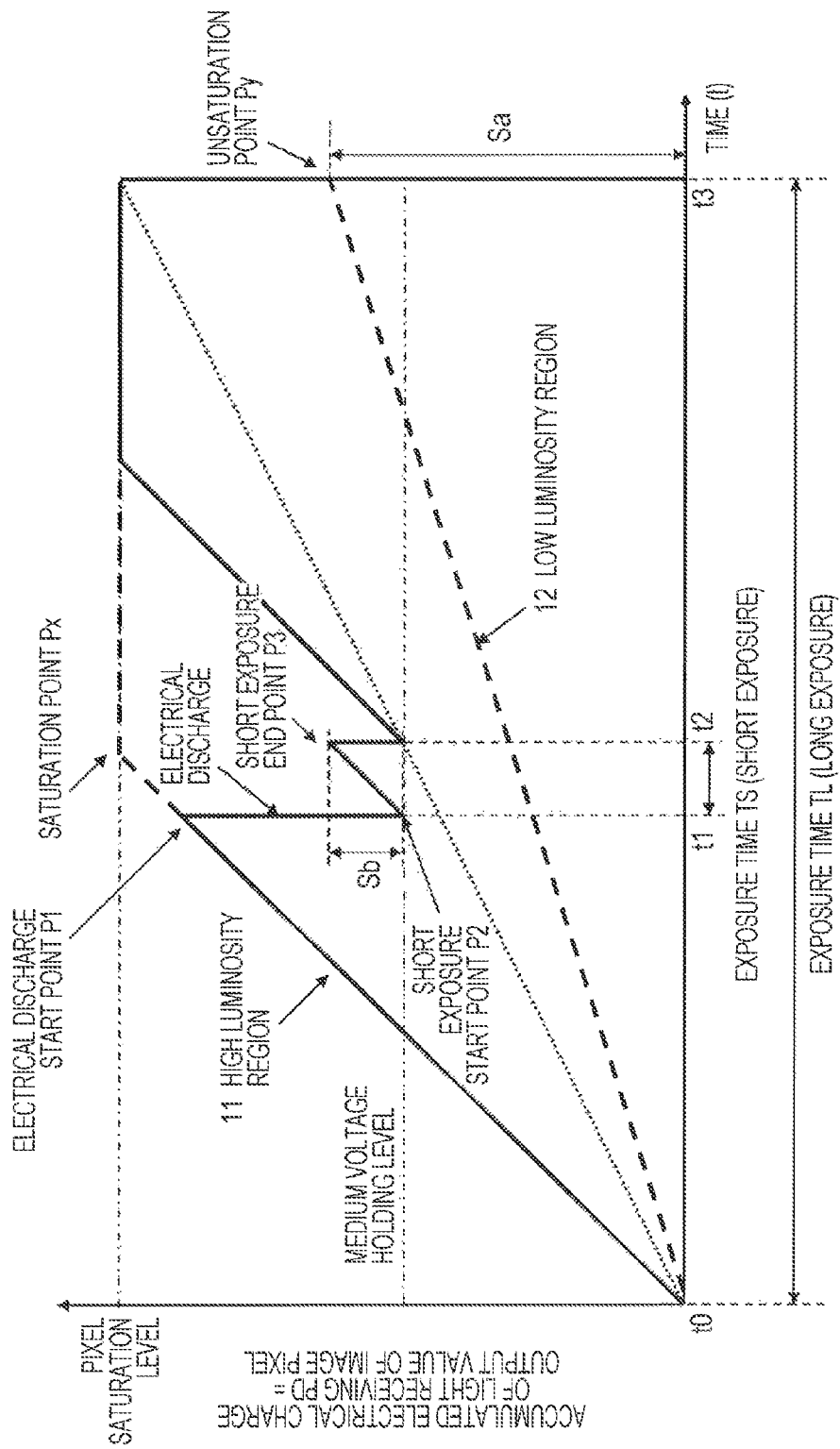
FIG. 1 is a diagram describing processing to obtain an image with a wide dynamic range by combining images with different, multiple exposure amounts.
Figure 2:
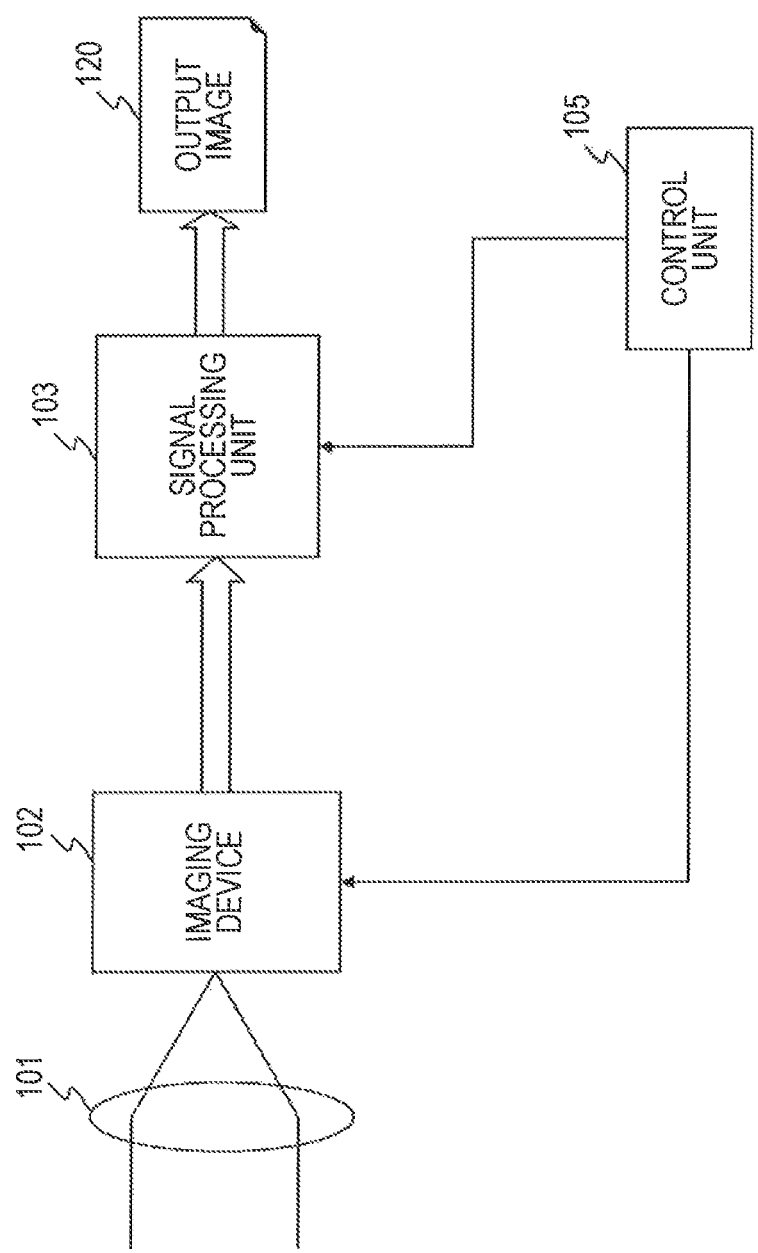
FIG. 2 is a diagram illustrating a configuration example of an image processing device of the present invention.

FIG. 2 is a block diagram illustrating a configuration of an imaging device, which is an example of the image processing device of the present invention. Light illuminated through an optical lens 101 is illuminated to an imaging device 102 configured, for example, by a CMOS image sensor, and output as image data by photoelectric conversion. The output image data is input into a signal processing unit 103. The signal processing unit 103 executes signal processing generally used in cameras such as white balance (WB) adjustment and gamma correction, and generates an output image 120. The output image 120 is stored in a storage unit not illustrated. It may also be output to a display unit.

A control unit 105 outputs control signals to each unit according to a program stored, for example, in memory not illustrated, and performs various processing control.

Hereinafter, multiple embodiments will be described, primarily regarding the configuration and processing of the imaging device.

2. Embodiments of Specific Configurations and Processing of the Image Processing Device

2-1. First Embodiment

First, a configuration and processing of the imaging device related to the first Embodiment for the image processing device of the present invention will be described.

Figure 3:
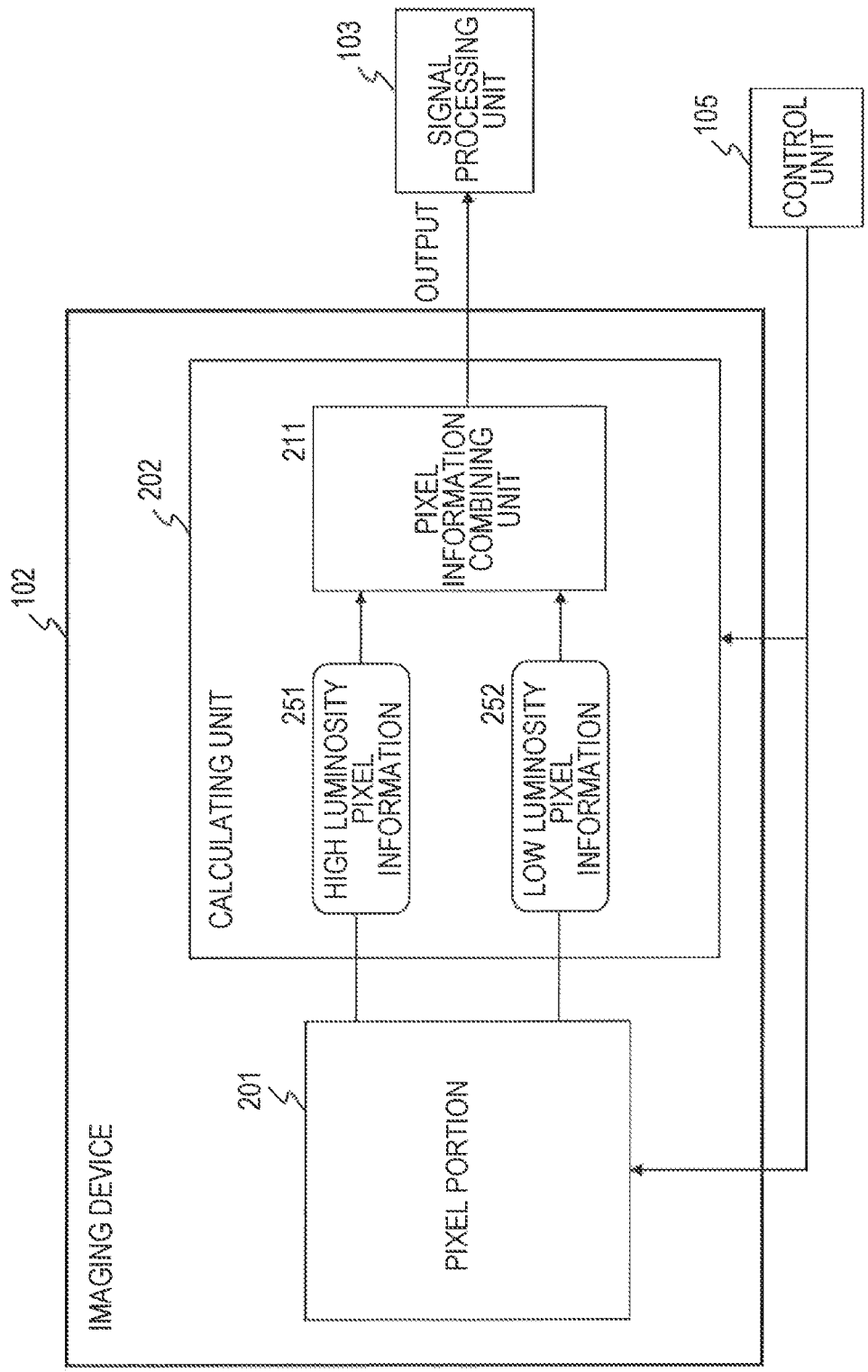
FIG. 3 is a diagram describing processing and imaging device configuration for the image processing device related to a first Embodiment of the present invention.

The imaging device 102 of the first Embodiment includes a pixel portion 201 and a calculating unit 202, as illustrated in FIG. 3.

The pixel portion 201 outputs electrical charge information corresponding to an exposure time by photoelectric conversion of each pixel of a Bayer array pixel array formed with RGB pixels, for example. Regarding the configuration of the first Embodiment, the pixel portion 201 is set with different exposure times in units of pixel regions (rows or lines for example) by control of the control unit 105 (shutter control). A high sensitivity pixel information 251 corresponding to an accumulated electrification based on a long exposure from a row set with a long exposure is output. Also, a low sensitivity pixel information 252 corresponding to an accumulated electrification based on a short exposure from a row set with a short exposure is output. The specific example of the control configuration for the exposure times will be described in detail later. Further, the control unit is set in the imaging device, and the processing control of the imaging device may be configured to be executed by the control of the control unit in the imaging device.

The calculating unit 202 inputs the high sensitivity pixel information 251 and the low sensitivity pixel information 252 output from the pixel portion 201, includes a pixel information combining unit 211 to generated one image information based on this input information. The output of the pixel information combining unit 211 is input to the signal processing unit 103. The signal processing unit 103 executes signal processing generally used in cameras such as white balance (WB) adjustment and gamma correction, for example, and generates the output image 120. The output image 120 is stored in a storage unit not illustrated. It may also be displayed on a display unit.

Figure 4:
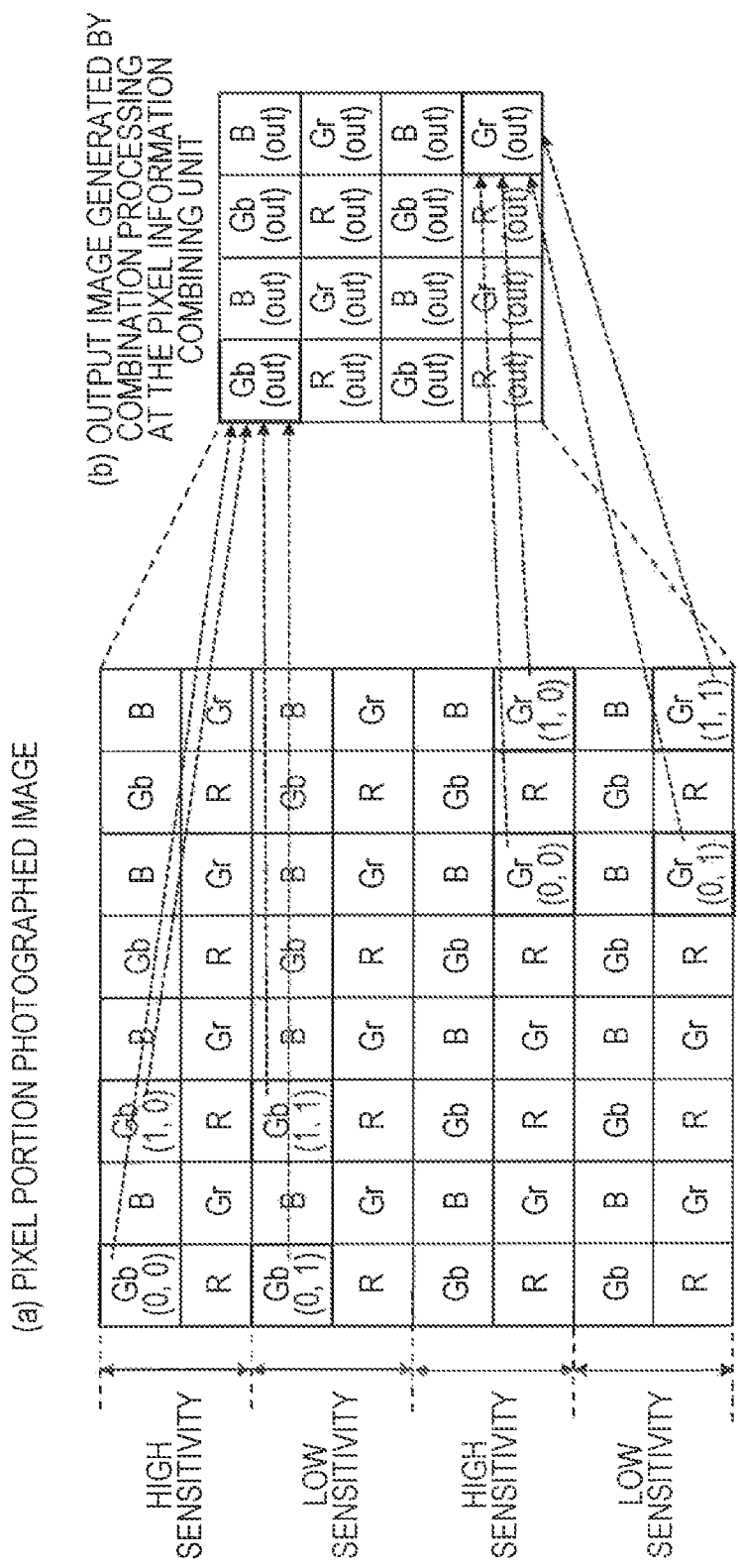
FIG. 4 is a diagram describing a specific example of a pixel information combining processing of the image processing device related to the first Embodiment of the present invention.

FIG. 4 is a diagram illustrating an example of a combining processing executed in the pixel information combining unit for the imaging device of the first Embodiment of the present invention.

FIG. 4 illustrates:
(a) the photographed image of the pixel portion
(b) the output image generated by combination processing from the pixel information combining unit Further, the figure illustrates only a partial region of a pixel information combination image and the photographed image of (a) and (b).

The photographed image of the pixel portion illustrated in FIG. 4(a) is a diagram corresponding to the configuration of the pixel portion 201 of the imaging device 102 in FIG. 3. According to the present example, the array of the color filters in the pixel portion 201 is a Bayer array, and has a configuration in which R, Gb, Gr, and B pixels are set according to a specified array.

The pixel information combining unit 211 of the calculating unit 202 in the imaging device 102 in FIG. 3 combines multiple pixel information from the pixel portion 201 illustrated in FIG. 4(a), generates the pixel information combination image illustrated in FIG. 4(b), and outputs this to the next-stage signal processing unit 103.

FIG. 4 illustrates a processing example in which the pixel value for one pixel of the output image is determined from among a total of four pixels that have different sensitivities, that is to say two high sensitivity pixels and two low sensitivity pixels.

That is to say, according to the present embodiment, the pixel information combining unit 211 determines the pixel value for one pixel of the output image based on 4 pixels that include the image photographed in the pixel portion 201. The output image for ¼ of the pixels in the pixel portion is generated and output by this processing.

The pixel value of a pixel Gb (out) for the upper left portion of the output image generated by the pixel information combining unit 211 illustrated in FIG. 4(b) is calculated based on the pixel value of the four pixels in the upper left portion of the pixel portion 201, which is the photographed image illustrated in FIG. 4(a), that is to say the pixels Gb (0,0), Gb (1,0), Gb (0,1), and Gb (1, 1).

As illustrated in the left side of the photographed image of the pixel portion in FIG. 4(a), this photographed image is mutually set to a high sensitivity pixel region and a low sensitivity pixel region, in units of two rows.

The high sensitivity pixel region is a region that performs long exposures, and the low sensitivity pixel region is a region that performs short exposures.

According to the configuration of the present embodiment, exposure time control is performed in units of one row of the pixel portion 201 in this way, and the image mutually set with the high sensitivity pixel region and the low sensitivity pixel region in units of two rows is photographed. The pixel information combining unit 211 inputs the pixel value of a pixel in this high sensitivity pixel region and the pixel value of a pixel in this low sensitivity pixel region to determine the pixel value for one output pixel.

As an example, a calculation example of the pixel value for the pixel Gb (out) in the upper left portion of the pixel information combination image in FIG. 4(b) will be described. The pixel information combining unit 211 calculates the pixel value for the pixel Gb (out) in the upper left portion of the pixel information combination image in FIG. 4(b), based on the pixel values of the two high sensitivity pixels and the two low sensitivity pixels, which are the four pixels in the upper left portion of the photographed image in FIG. 4(a), as follows:

High sensitivity pixels: Gb (0,0) and Gb (1,0)
Low sensitivity pixels: Gb (0,1) and Gb (1,1).

The pixel information combining unit 211 executes the same pixel value calculation processing on all pixels of the pixel information combination image in FIG. 4(b), that is to say for the pixels Gb (out), Gr (out), B (out), and R (out). That is to say, all of these pixel values for the output image are calculated using the pixel values of the two high sensitivity pixels and the two low sensitivity pixels of the photographed image in FIG. 4(a). However, when calculating one output pixel value, the contribution ratio of the pixel values for the four input pixels is not constant (rate of distribution), and processing is performed, for example, to determine a dependence on the brightness of the photographic subject. This processing will be described later.

Also, the example illustrated in FIG. 4 illustrates an example in which the high sensitivity pixel region and the low sensitivity pixel region is mutually set in units of two rows, but this is just one example, and the cutover unit of the pixel regions may be set to values other than two rows.

The pixel value calculation processing example of the pixel information combining unit 211 will be described using the example of the pixel value calculation of the Gb (out) illustrated in FIG. 4(b).

The pixel value of the Gb (out) illustrated in FIG. 4(b) is, for example, calculated according to the following expression (Expression 1).

$$Gb(\text{out})=[Gb(0,0)\times\alpha]+[Gb(1,0)\times\beta]+[Gb(0,1)\times(\text{Gain})\times\gamma]+[Gb(1,1)\times(\text{Gain})\times\epsilon] \quad \text{(Expression 1)}$$

where Gb (x,y) is the pixel value of the photographed image at the position of the coordinates (x,y), the Gain is the gain value for correcting the sensitivity ratio (predetermined value), and $\alpha$, $\beta$, $\gamma$, and $\epsilon$ are coefficients for setting the contribution ratio of the input pixels, and are coefficients in which a relationship is satisfied wherein $\alpha+\beta+\gamma+\epsilon=1$.

In this way, the pixel information combining unit 211 inputs the pixel values from multiple pixels that include at least a high sensitivity pixel and a low sensitivity pixel from the multiple pixels of the input image at a position corresponding to the pixel position of the output image illustrated in FIG. 4(b), and calculates each pixel value of the pixel information combination image illustrated in FIG. 4(b) according to the previously described expression. According to the present embodiment, pixel values from two high sensitivity pixels and two low sensitivity pixels are input, and each pixel value for the pixel information combination image in FIG. 4(b) is calculated according to the previously described expression.

Besides Gb, the same pixel value calculation processing is executed for Gr, R, and B using the previously described (Expression 1).

That is to say, the pixel value of the Gr (out) for the output image in FIG. 4(b) is calculated using the two Gr pixel values of the high sensitivity pixel regions and the two Gr (out) pixel values of the low sensitivity pixel regions regarding the pixel region of the photographed image corresponding to the pixel position of the Gr (out) of the pixel information combination image.

The pixel value of the R (out) for the output image in FIG. 4(b) is calculated using the two R pixel values of the high sensitivity pixel regions and the two R (out) pixel values of the low sensitivity pixel regions regarding the pixel region of the photographed image corresponding to the pixel position of the R (out) of the pixel information combination image.

The pixel value of the B (out) for the output image in FIG. 4(b) is calculated using the two B pixel values of the high sensitivity pixel regions and the two B (out) pixel values of the low sensitivity pixel regions regarding the pixel region of the photographed image corresponding to the pixel position of the B (out) of the pixel information combination image.

As illustrated in the previously described (Expression 1), when performing the pixel value calculation processing for the output image, the processing is performed using an averaged weight applied according to the coefficients $\alpha$, $\beta$, $\gamma$, and $\epsilon$ corresponding to the pixel values of the four photographed image, which is the input image.

The Gain within the expressions is a coefficient for correcting sensitivity differences.

For example, when the sensitivity ratio between the low sensitivity pixels and the high sensitivity pixels is 1:4, a gain of fourfold is applied to the output from the low sensitivity pixels, and regarding the previously described expression (Expression 1), the gain is set as such:

Gain=4.0.

As a result, the linearity corresponding to the brightness is maintained, and a wide dynamic range may be realized.

Figure 5:
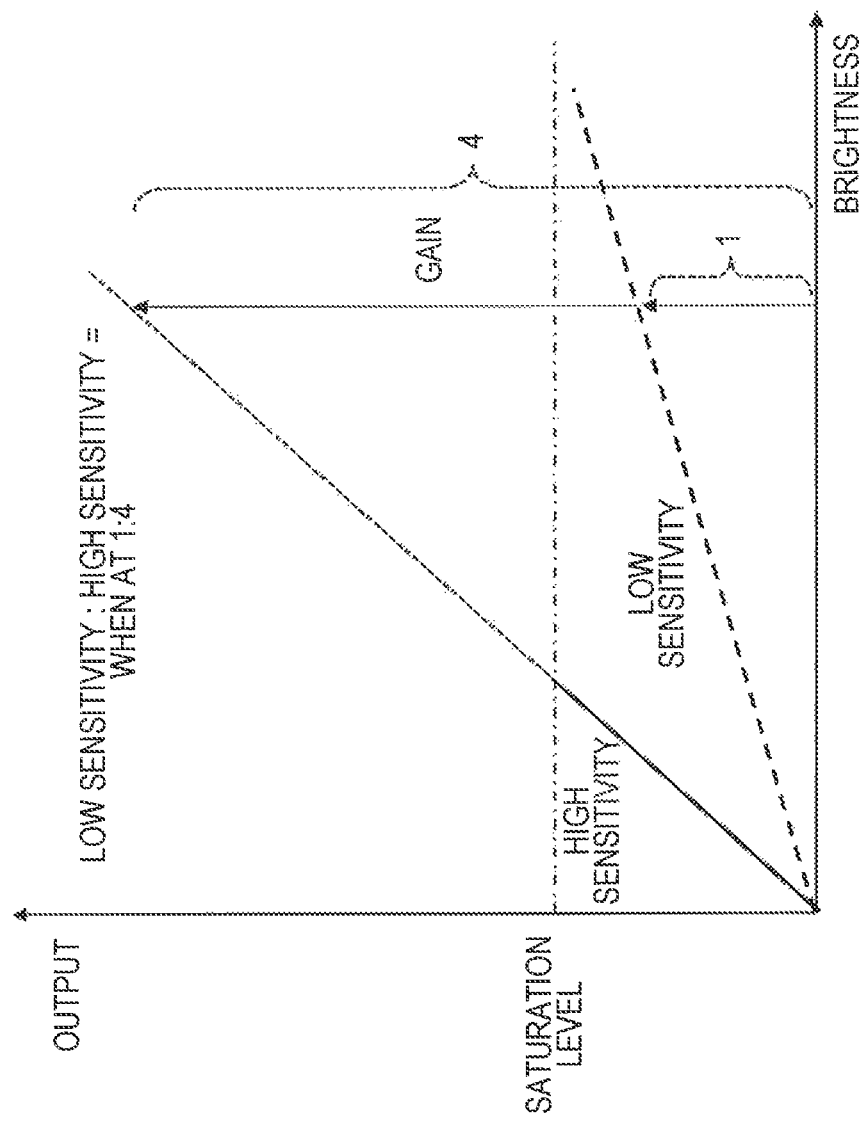
FIG. 5 is a diagram describing a gain control as an adjustment processing of a corresponding relationship between brightness and output of high sensitivity pixels and low sensitivity pixels, and the output of a low sensitivity pixel.

FIG. 5 is a diagram describing a gain control.

As illustrated in FIG. 5, when the sensitivity ratio between the low sensitivity pixels and the high sensitivity pixels is 1:4, a gain of 400% is applied corresponding to the output from the low sensitivity pixels, so that the output from the low sensitivity pixels matches the output from the high sensitivity pixels.

The $\alpha$, $\beta$, $\gamma$, and $\epsilon$ from the previously described (Expression 1) are coefficients for setting the contribution ratio of each pixel as previously described. The values of these coefficients $\alpha$, $\beta$, $\gamma$, and $\epsilon$ may all use different values corresponding to the colors of the output pixels, for example, Gb, Gr, B, and R. Also, they may be set to update depending on the brightness of the photographic subject.

For example, there are cases in which the pixel values for the high sensitivity pixels are at a saturation state corresponding to a bright photographic subject, that is to say, at the maximum pixel value, and so a correct pixel value may not be reflected.

In this kind of case, according to the previously described (Expression 1), for example:

$\alpha=\beta=0$, and so the pixel value for the high sensitivity pixels Gb (0,0) and Gb (1,0) are not applied, $\gamma+\epsilon=1$, and so only the pixel values of the low sensitivity pixels Gb (0,1) and Gb (1,1) are applied to execute the processing to calculate the output pixel values.

That is to say, the previously described (Expression 1) calculates the pixel values Gb (out) of the output pixel by only applying the pixel values of the low sensitivity pixels Gb (0,1) and Gb (1,1) as such:

$$Gb(\text{out})=[Gb(0,0)\times\alpha]+[Gb(1,0)\times\beta]+[Gb(0,1)\times(\text{Gain})\times\gamma]+[Gb(1,1)\times(\text{Gain})\times\epsilon]=[Gb(0,1)\times(\text{Gain})\times\gamma]+[Gb(1,1)\times(\text{Gain})\times\epsilon].$$

As a result of this kind of processing, the output pixel value may be set by using only the valid pixel value information of the low sensitivity pixels without the receiving any effects of the pixel values from the saturated high sensitivity pixels.

The Gain value and the setting values for the $\alpha$, $\beta$, $\gamma$, and $\epsilon$ corresponding to the brightness of the photographic subject, for example, in the previously described (Expression 1), or a calculation processing algorithm for these values should be previously specified, and stored in a memory within the imaging device. This may also be implemented as hardware. The pixel information combining unit 211 acquires or calculates the Gain value and the coefficients $\alpha$, $\beta$, $\gamma$, and $\epsilon$ by applying values stored in memory, hardware, or an algorithm, for example, and calculating the output values according to the previously described (Expression 1), that is to say, the pixel values of the configuration pixels for the pixel information combination image.

Figure 6:
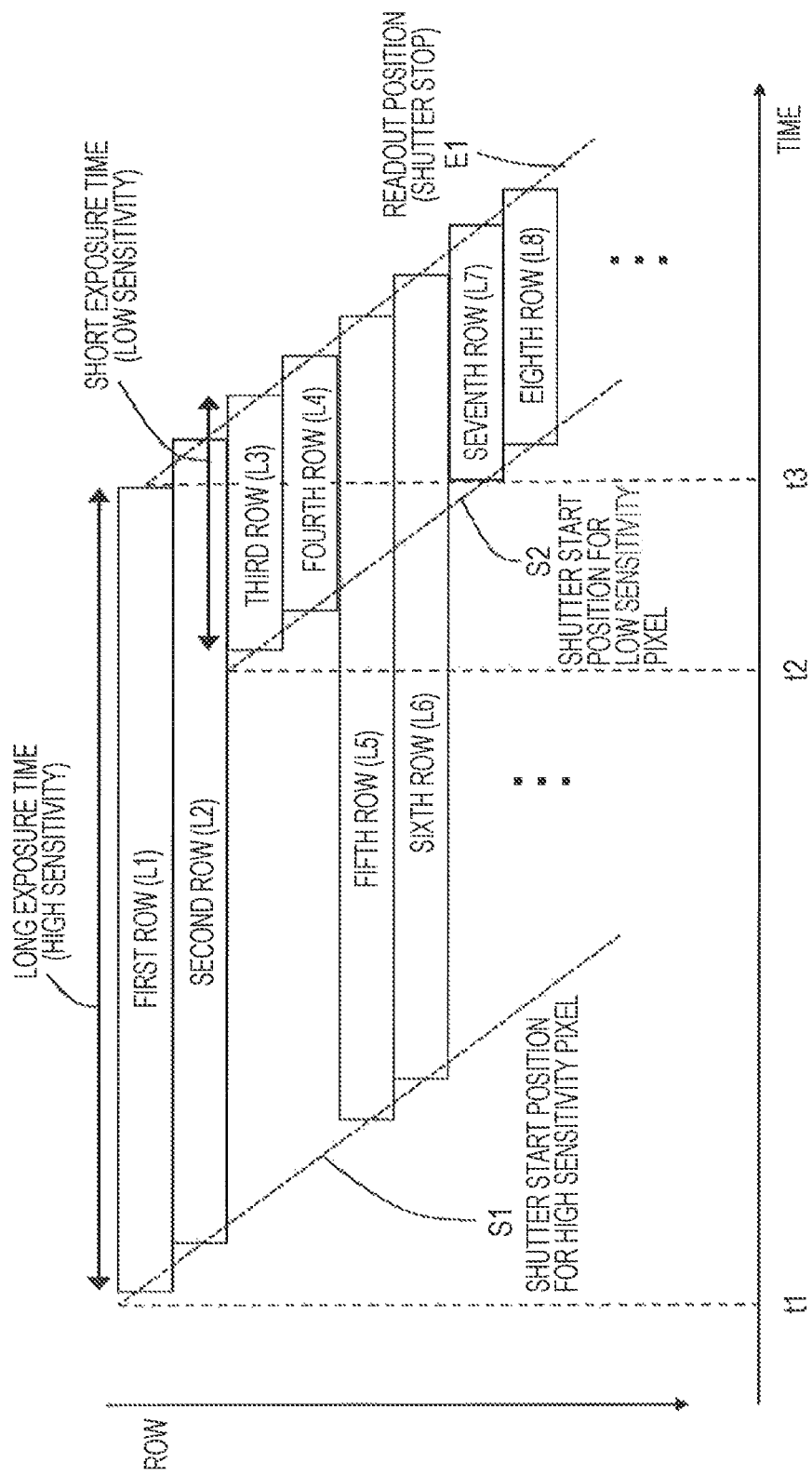
FIG. 6 is a diagram describing an example of exposure time control processing of a pixel portion in the imaging device of the image processing device related to the first Embodiment of the present invention.

FIG. 6 is a diagram describing an example of control of the exposure times for the high sensitivity pixel regions and the low sensitivity pixel regions in the pixel portion 201.

The vertical axis in FIG. 6 represents pixel rows of the pixel portion, and the horizontal axis represents elapsed time. The rows of the vertical axis start at a first row of the pixel portion at the top, and the rows descend from there in order (row number=2, 3, 4, 5 . . . ).

The time of the horizontal axis illustrates the time elapsed according to a progression in the right direction.

FIG. 6 illustrates an example of the control processing for the exposure times of the high sensitivity pixel regions and the low sensitivity pixel regions when the sensitivity ratio between the low sensitivity pixels and the high sensitivity pixels is 1:4.

According to the present example, the exposure time for the high sensitivity pixels is set to 4 times the exposure time of the low sensitivity pixels.

The exposure time of an electron shutter is controlled in units of rows to set the high sensitivity pixel regions and the low sensitivity pixel regions. For example, a CMOS imager used as the pixel portion 201 of the imaging device 102 illustrated in FIG. 3 has a configuration that enables electron shutter control in units of rows. That is to say, this configuration enables arbitrary exposure times to be set in units of rows. For example, the exposure time control in units of rows is executed based on control signals output from the control unit 105 illustrated in FIG. 3 corresponding to the pixel portion 201 of the imaging device 102.

The exposure time control example illustrated in FIG. 6 is an exposure time control example corresponding to a configuration in which the high sensitivity pixel regions and the low sensitivity pixel regions are mutually set in units of two rows, in the same way as illustrated to the left side of the photographed image of the pixel portion in FIG. 4(a).

Row 1 and row 2 are the high sensitivity pixel regions which have long exposure processing.

Row 3 and row 4 are the low sensitivity pixel regions which have short exposure processing.

The rows from row 5 and below are also mutually set in units of two rows where the high sensitivity pixel regions have long exposure processing executed, and the low sensitivity pixel regions have short exposure processing executed.

As illustrated in FIG. 6, for high sensitivity pixel regions such as row 1 and row 2, row 5 and row 6, and so on, a first row shutter starts (exposure start) from a timing t1, and the exposure starts from the top row moving down to latter rows. A dotted line (S1) to the lower right from the timing t1 represents the shutter start position (exposure start) for each row of the high sensitivity pixel rows (row number=1, 2, 5, 6, . . . ). Further, the open and close operation of the shutter is executed in order from the top row toward the latter rows, and so the processing time according to the progression to the latter rows is delayed. This effect is set by the line in the lower right.

For low sensitivity pixel regions such as row 3 and row 4, row 7 and row 8, and so on, a third row shutter starts (exposure start) from a timing t2, and the exposure starts from the top row moving down to latter rows. A dotted line (S2) to the lower right from the timing t2 represents the shutter start position (exposure start) for each row of the low sensitivity pixel rows (row number=3, 4, 7, 8, . . . ). Further, the open and close operation of the shutter is executed in order from the top row toward the latter rows, and so the processing time according to the progression to the latter rows is delayed. This effect is set by the line in the lower right.

Further, a dotted line (E1) at the lower right of the right edge of FIG. 6 represents a readout start position (exposure end) of the electrical charge accumulated in each pixel. This pixel value readout processing is not separated into high sensitivity pixels rows (1, 2, 5, 6, . . . ) and low sensitivity pixel rows (3, 4, 7, 8, . . . ), but is executed for all rows. From a timing t3, the readout of the first row starts, and the readout of pixel values (accumulated electrical charge) for all rows is performed proceeding in a descending row order for row 2, 3, 4, 5, 6, 7, . . . according to an elapsed time.

That is to say, the shutter control illustrated in FIG. 6 is as follows.

The exposure start time for the high sensitivity pixel rows (1, 2, 5, 6, . . . ) is set first (t1), the exposure start time for the low sensitivity pixel rows (3, 4, 7, 8, . . . ) is set later (t2).

Further, from a timing t3 for the readout (exposure end) executes consecutively from the top row.

As a result of this processing, the exposure time for the high sensitivity pixel rows (1, 2, 5, 6, . . . ) may be set longer (4 times for the present example) than the exposure time for the low sensitivity pixel rows (3, 4, 7, 8, . . . ), and the accumulated electrical charge (pixel value) may be obtained from each pixel, based on the different exposure times.

According to the present embodiment as described with reference to FIG. 4 and FIG. 6, the length of exposure times is changed every two rows. The longer exposure times are for the high sensitivity, and the shorter exposure times are for the low sensitivity.

Figure 7:
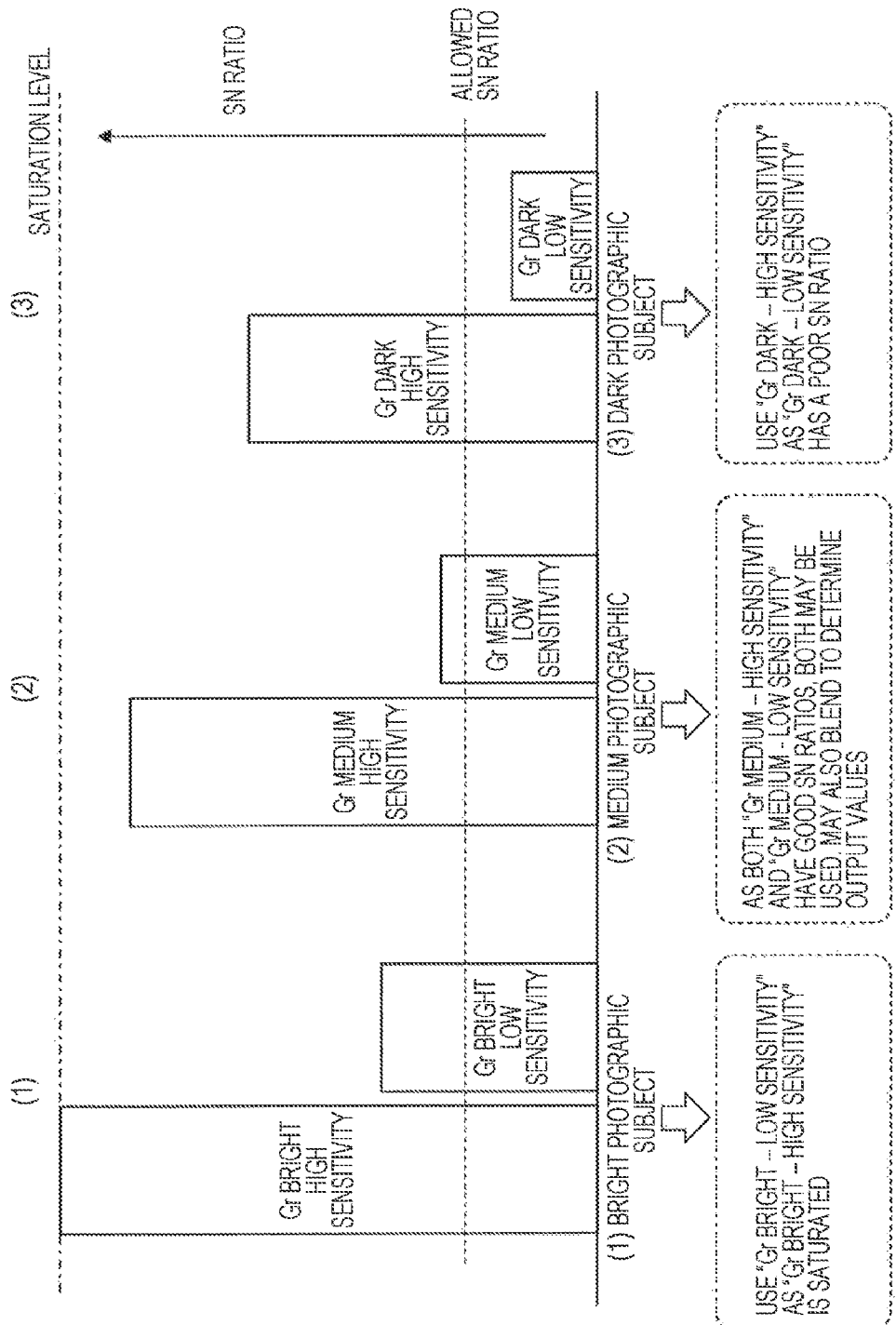
FIG. 7 is a diagram describing an example of an output pixel determining algorithm of the pixel information combining unit for the imaging device of the image processing device related to the first Embodiment of the present invention.

FIG. 7 is a diagram describing an example of a combined image generated by the pixel information combining unit 211 as a result of the exposure control illustrated in FIG. 6, that is to say a generation processing of the pixel information combination image.

As described with reference to FIG. 4 and (Expression 1), the pixel information combining unit 211 as illustrated in FIG. 3 applies the pixel values of the multiple pixels and determines the pixel value for one pixel of the output image as illustrated in FIG. 4(b).

The pixel information combining unit 211 calculates the pixel value for one pixel from the multiple pixel values of the photographed image, according to the previously described expression (Expression 1) which is a pixel value calculating expression of a combined image, which is:

$$Gb(\text{out})=[Gb(0,0)\times\alpha]+[Gb(1,0)\times\beta]+[Gb(0,1)\times(\text{Gain})\times\gamma]+[Gb(1,1)\times(\text{Gain})\times\epsilon].$$

As described previously, the coefficients in the previously described expression α, β, γ, and ϵ may be set to update corresponding to the brightness of the photographic subject, for example. For example, there are cases in which the pixel values for the high sensitivity pixels are at a saturation state corresponding to a bright photographic subject, that is to say, at the maximum pixel value, and so a correct pixel value may not be reflected. In this kind of case, according to the previously described (Expression 1), for example, α=β=0, and so the pixel value for the high sensitivity pixels Gb (0,0) and Gb (1,0) are not applied, and γ+ϵ=1, so only the pixel values of the low sensitivity pixels Gb (0,1) and Gb (1,1) are applied to execute the processing to calculate the output pixel values.

FIG. 7 illustrates three processing states for this kind of processing. That is to say, it is a diagram describing states for combining processing corresponding to the imaging regions of these photographic subjects:

(1) Bright photographic subject (high sensitivity pixels have a saturated value)

(2) Medium photographic subject (high sensitivity pixels have a value below saturation, and both high sensitivity pixels and low sensitivity pixels have an SN ratio at or above a predetermined allowance)

(3) Dark photographic subject (high sensitivity pixels have a value below saturation, and low sensitivity pixels have an SN ratio below a predetermined allowance).

Each processing state will be described.

(1) Bright photographic subject (high sensitivity pixels have a saturated value)

As illustrated in FIG. 7(1), when the high sensitivity pixels have a saturated value, the pixel value of the high sensitivity pixels are the maximum pixel value corresponding to the maximum electrical charge amount that may be accumulated in each pixel of the pixel portion, and is in a state in which a correct pixel value may not be reflected.

In this kind of case, the pixel values of the high sensitivity pixels are not applied to the pixel value calculation of the output pixels for the pixel information combination image. According to the example illustrated in this FIG. 7(1), the setting of the coefficients $\alpha$, $\beta$, $\gamma$, and $\epsilon$ in the previously described (Expression 1) is set as follows.

$\alpha=\beta=0$, and so the pixel value for the high sensitivity pixels Gb (0,0) and Gb (1,0) are not applied, and $\gamma+\epsilon=1$, so only the pixel values of the low sensitivity pixels Gb (0,1) and Gb (1,1) are applied to execute the processing to calculate the output pixel values.

That is to say, for the calculation processing of Gb (out) in FIG. 4, for example:

$Gb(\text{out})=[Gb(0,0)\times\alpha]+[Gb(1,0)\times\beta]+[Gb(0,1)\times(\text{Gain})\times\gamma]+[Gb(1,1)\times(\text{Gain})\times\epsilon]=[Gb(0,1)\times(\text{Gain})\times\gamma]+[Gb(1,1)\times(\text{Gain})\times\epsilon]$.

As previously described, the pixel value for the high sensitivity pixels Gb (0,0) and Gb (1,0) are not applied, so only the pixel values of the low sensitivity pixels Gb (0, 1) and Gb (1,1) are applied to calculate the output pixel values of the pixel information combination image.

According to the example illustrated in FIG. 7(1), $\alpha=\beta=0$ $\gamma+\epsilon=1$.

Various settings are enabled within a range in which the above restrictions are satisfied. As an example, let's say that $\gamma+\epsilon=0.5$.

With this kind of setting, an average value of two low sensitivity pixels may be set as the pixel value for one output pixel for the pixel information combination image.

(2) Medium photographic subject (high sensitivity pixels have a value below saturation, and both high sensitivity pixels and low sensitivity pixels have an SN ratio at or above a predetermined allowance)

As illustrated in FIG. 7(2), photographic subjects with a medium brightness, that is to say, when the high sensitivity pixels have a value below saturation, and both high sensitivity pixels and low sensitivity pixels have an SN ratio at or above a predetermined allowance, the following processing is performed.

In order to determine that the correct pixel value is reflected for both the high sensitivity pixels and the low sensitivity pixels, one of these is selected and used to set the pixel value of the pixel information combination image, or a blend processing using all of these may be executed to calculate the pixel value of the pixel information combination image.

In this kind of case, the coefficients $\alpha$, $\beta$, $\gamma$, $\epsilon$ in the previously described (Expression 1) are set as follows.

$\alpha+\beta+\gamma+\epsilon=1$

Various settings are enabled within a range in which the above restrictions are satisfied. As an example, let's say that $\alpha+\beta+\gamma+\epsilon=0.25$.

With this kind of setting, an average value of a total of 4 pixels, the two high sensitivity pixels and the two low sensitivity pixels, may be set as the pixel value for one output pixel for the pixel information combination image.

(3) Dark photographic subject (high sensitivity pixels have a value below saturation, and low sensitivity pixels have an SN ratio below a predetermined allowance)

As illustrated in FIG. 7(3), dark photographic subjects, that is to say, when the high sensitivity pixels have a value below saturation, and low sensitivity pixels have an SN ratio below a predetermined allowance, the following processing is performed.

The pixel values of the low sensitivity pixels have an SN ratio below a predetermined allowance, and so it may not be said that a correct pixel value is reflected. In this kind of case, the pixel values for the low sensitivity pixels are not applied, and the output pixel value of the pixel information combination image is calculated based only on the pixel values of the high sensitivity pixels.

In this kind of case, the coefficients $\alpha$, $\beta$, $\gamma$, $\epsilon$ in the previously described (Expression 1) are set as follows.

$\gamma=\epsilon=0$ $\alpha+\beta=1$

That is to say, for the calculation processing of Gb (out) in FIG. 4, for example, $Gb(\text{out})=[Gb(0,0)\times\alpha]+[Gb(1,0)\times\beta]+[Gb(0,1)\times(\text{Gain})\times\gamma]+[Gb(1,1)\times(\text{Gain})\times\epsilon]=[Gb(0,0)\times\alpha]+[Gb(1,0)\times\beta]$.

As previously described, the pixel value for the low sensitivity pixels Gb (0,1) and Gb (1,1) are not applied, so only the pixel values of the high sensitivity pixels Gb (0,0) and Gb (1,0) are applied to calculate the output pixel values of the pixel information combination image.

$\gamma+\gamma=0$ $\alpha+\beta=1$

Various settings are enabled within a range in which the above restrictions are satisfied. As an example, let's say that $\alpha+\beta=0.5$.

With this kind of setting, an average value of the two high sensitivity pixels may be set as the pixel value for one output pixel for the pixel information combination image.

As described with reference to FIG. 7, when determining each pixel value for the pixel information combination image to be generated, the pixel information combining unit 211 determines whether to use either or both of the high sensitivity pixels and the low sensitivity pixels, depending on the brightness of the photographic subject. When bright, there are cases in which the high sensitivity pixels are saturated (invalid), and in this case, it is preferable to use the low sensitivity pixel information as it is, but when both of the pixel information are valid, which one to be used may be determined after considering the SN ratio.

A specific example of the processing of the pixel information combining unit 211 is described with reference to FIG. 8.

Figure 8:
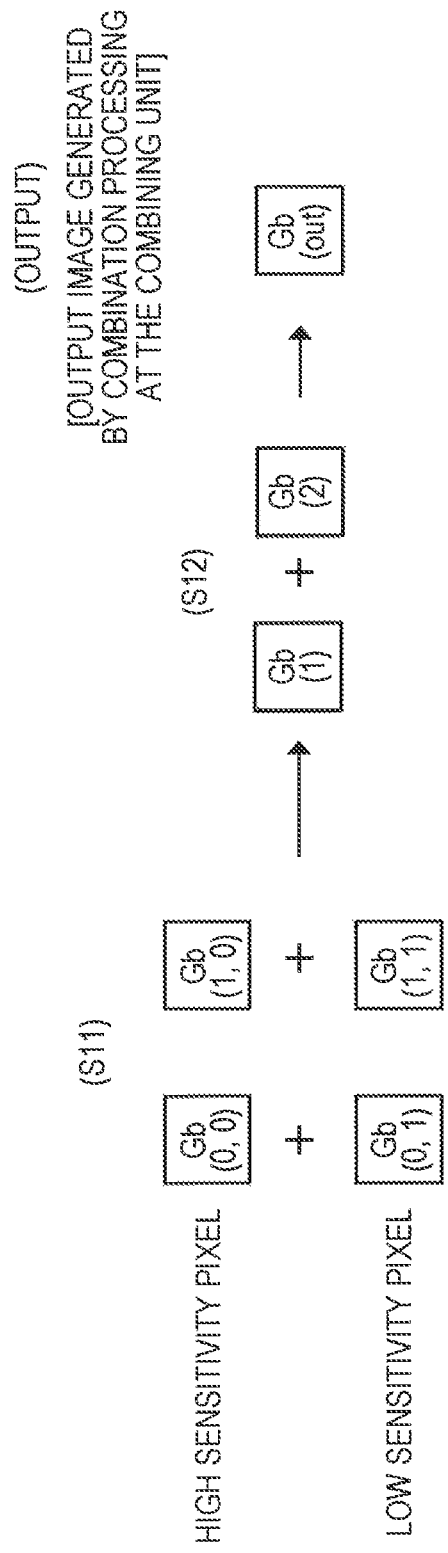
FIG. 8 is a diagram describing an example of an output pixel determining algorithm of the pixel information combining unit for the imaging device of the image processing device related to the first Embodiment of the present invention.

The processing illustrated in FIG. 8 is one sequence example of the processing executed by the pixel information combining unit 211. According to the example illustrated in FIG. 8, the pixel value calculation for the pixel information combination image is executed by the following sequence.

First, at a step S11, intermediate combination pixel values are calculated based on two pixels in a vertical direction.

Next, at a step S12, the medium pixel values based on the two pixels in a vertical direction are used to execute a pixel calculation of the image that will eventually be output.

That is to say, at the step S11, only one high sensitivity pixel and one low sensitivity pixel are selected to calculate an intermediate combination pixel value, and afterwards, at the step S12, a pixel calculation is executed for the image that will eventually be output, based on these intermediate combination pixel values.

A setting example of the weight coefficients corresponding to the contribution ratio for each pixel when executing this sequence will be described with reference to FIG. 9.

FIG. 9(1) illustrates an example of a calculation and the coefficients applied to the processing for calculating the intermediate combination pixel value based on the two pixels in a vertical direction in step S11 in FIG. 8.

FIG. 9(2) illustrates a calculation example applied to the final pixel value calculation processing based on the two intermediate combination pixel values in step S12 in FIG. 8.

As illustrated in FIG. 9(1), the calculation executed as the calculation processing of the intermediate combination pixel value based on the two pixels in a vertical direction in step S11 in FIG. 8 is as follows.

$$\text{Output}[Gb(1)] = [Gb(0,0) \times W_H] + [Gb(0,1) \times (\text{Gain}) \times W_L] \quad \text{(Expression 2)}$$

Further, the previously described (Expression 2) represents the calculation expression of one intermediate combination pixel value [Gb (1)] executed at step S11 in FIG. 8, regarding the calculation processing of the pixel value Gb (out) for the pixel information combination image previously described with reference to FIG. 4.

The calculation of one more intermediate combination pixel value [Gb (2)] is executed according to the following expression.

$$\text{Output}[Gb(2)] = [Gb(1,0) \times W_H] + [Gb(1,1) \times (\text{Gain}) \times W_L] \quad \text{(Expression 3)}$$

Regarding the previously described (Expression 2) and (Expression 3),

Gb (x,y) is the pixel value of the photographed image at the position of the coordinates (x,y), Gain is the gain value for correcting the sensitivity ratio (predetermined value), $W_H$ is the weight coefficient corresponding to the high sensitivity pixels of the input pixels, and $W_L$ is the weight coefficient corresponding to the low sensitivity pixels of the input pixels, where the coefficients satisfy a relationship in which $W_H + W_L = 1$.

FIG. 9(1) illustrates a setting example of the weight coefficient $W_H$ corresponding to the high sensitivity pixels and the weight coefficient $W_L$ corresponding to the low sensitivity pixels of the input pixels.

Here, the setting uses a different coefficient for the pixel values of the low sensitivity pixels.

Specifically, the following setting of coefficients is used, as illustrated in FIG. 9(1), for example.

Further, the pixel values for each pixel are output as 10-bit values (0 through 1023).

The following setting corresponds to a pixel value (data) of the low sensitivity pixels.

(a) When 0≤data<50: $W_H = 1.0$ and $W_L = 0$
(b) When 50≤data<100: $W_H = 0.5$ and $W_L = 0.5$
(c) When 100≤data<1023: $W_H = 0$ and $W_L = 1.0$ This coefficient setting is based on the following assumptions.

(a) When 0≤data<50

In this way, when the pixel value (data) for the low sensitivity pixels is small, the brightness of the photographic subject is low, and the SN ratio for the pixel values of the low sensitivity pixels are assumed to be low. In this case, the reliability of the pixel value (data) for the low sensitivity pixels is determined to be low, and also the pixel values for the nearby high sensitivity pixels are assumed to not be saturated. In this kind of case, the weight coefficient $W_L$ corresponding to the pixel values for the low sensitivity pixels is 0, and the weight coefficient $W_H$ corresponding to the pixel values for the high sensitivity pixels is 1, and so the pixel value [Gb (1)] for the intermediate combination pixel value is calculated depending only on the pixel values of the high sensitivity pixels.

(b) When 50≤data<100

In this way, when the pixel value (data) for the low sensitivity pixels is medium, the brightness of the photographic subject is medium, and the SN ratio for the pixel values of the low sensitivity pixels are assumed to be good. In this case, the reliability of the pixel value (data) for the low sensitivity pixels is determined to be high, and also the pixel values for the nearby high sensitivity pixels are assumed to not be saturated. In this kind of case, the pixel values of the low sensitivity pixels and the pixel values of the high sensitivity pixels are blended. That is to say, the weight coefficient $W_L$ corresponding to the pixel values for the low sensitivity pixels is 0.5, and the weight coefficient $W_H$ corresponding to the pixel values for the high sensitivity pixels is 0.5, and so the pixel value [Gb (1)] for the intermediate combination pixel value is calculated by an average of the two pixel values from the high sensitivity pixel and the low sensitivity pixel.

(c) When 100≤data<1023

In this way, when the pixel value (data) for the low sensitivity pixels is high, the brightness of the photographic subject is extremely high. In this case, the SN ratio for the pixel values of the low sensitivity pixels are good, and the reliability of the pixel value (data) for the low sensitivity pixels is determined to be high, but the pixel values for the nearby high sensitivity pixels are assumed to be saturated. In this kind of case, the weight coefficient $W_H$ corresponding to the pixel values for the high sensitivity pixels is 0, the weight coefficient $W_L$ corresponding to the pixel values for the low sensitivity pixels is 1, and so the pixel value [Gb (1)] for the intermediate combination pixel value is calculated depending only on the pixel values of the low sensitivity pixels.

In this way, the setting of the coefficient may be performed using the low sensitivity pixel information. Further, three types were used here for simplification, but a function for calculating the weight based on the low sensitivity pixels may be set in advance, and the pixel information combining unit 211 as illustrated in FIG. 3 may have a configuration in which the coefficients $W_H$ and $W_L$ are calculated by executing a calculation that applies the previously set function, based on the low sensitivity pixel information 252 input from the pixel portion 201.

FIG. 9(2). illustrates the processing of step S12 in FIG. 8, that is to say, a calculation example applied to the final pixel value calculation processing based on the two intermediate combination pixel values.

As illustrated in this FIG. 9(2), the calculation executed as the final pixel value calculation processing based on the intermediate combination pixel values in step S12 in FIG. 8 is as follows.

$$\text{Output}[Gb(\text{out})] = [Gb(1) \times 0.5] + [Gb(2) \times 0.5] \quad \text{(Expression 4)}$$

Further, the previously described (Expression 4) represents the calculation expression for the final pixel value calculation processing, based on the two intermediate combination pixel values executed in step S12 in FIG. 8, regarding the calculation processing of the pixel value Gb (out) for the pixel information combination image previously described with reference to FIG. 4.

Here an example in which the final pixel value calculation is performed by simple averaging of the two intermediate combination pixel values.

Further, the pixel value calculation processing example for the pixel information combination image described with reference to FIG. 8 and FIG. 9 is only one example, various other processing is also possible, such as setting a coefficient for correction variances in median points caused by addition during the setting of the weight coefficients, for example.

Also, for example, when having a Bayer array or other pixel configuration formed from the pixels R, Gr, Gb, and B described with reference to FIG. 2, the weight coefficients, $W_H$ and $W_L$ for example, applied the calculation of each pixel for the pixel information combination image may be calculated individually, and the configuration may use weight values already calculated for nearby pixels previously processed.

A usage example of this weight coefficient already calculated is described with reference to FIG. 10.

Figure 10:
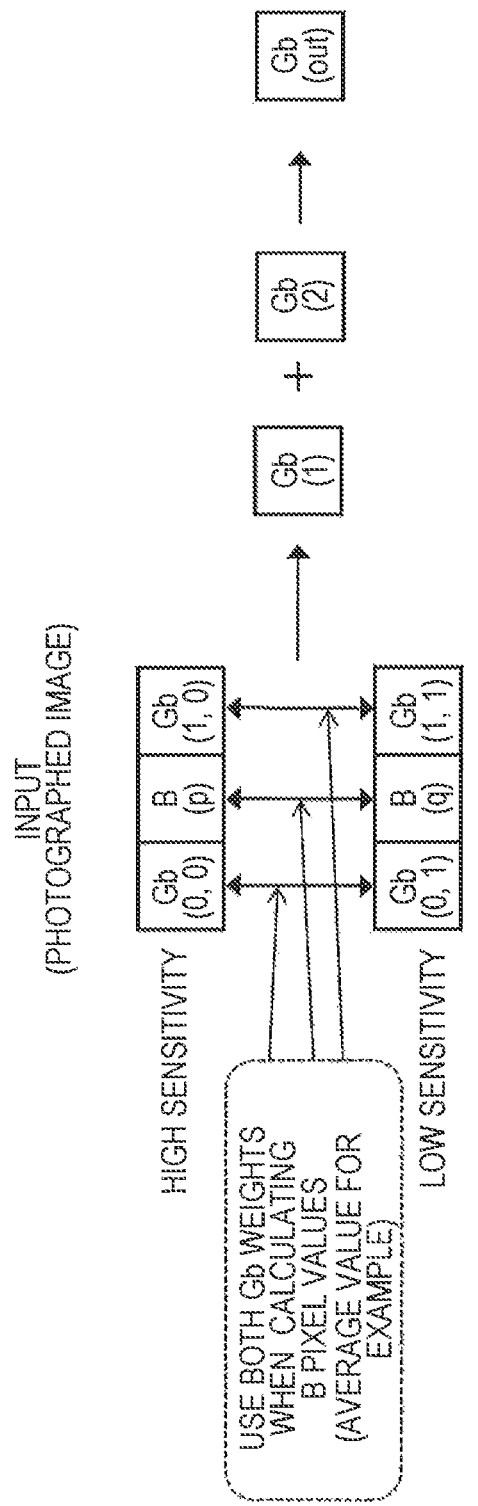
FIG. 10 is a diagram describing an example of an output pixel determining algorithm of the pixel information combining unit for the imaging device of the image processing device related to the first Embodiment of the present invention.

The example illustrated in FIG. 10 is a diagram describing a processing example when the calculation of the Gb pixel for the output image is performed in advance at the pixel information combining unit, and afterwards the calculation of the B pixel is performed.

In FIG. 10, the calculation of intermediate combination pixel values [Gb (1)] and [Gb (2)] is executed according to the following expression, in accordance with the coefficient setting described with reference to FIG. 9(1).

$$\text{Output}[Gb(1)]=[Gb(0,0) \times W_{H1}+[Gb(0,1) \times (\text{Gain}) \times W_{L1}]$$

$$\text{Output } [Gb(1)]=[Gb(1,0) \times W_{H2}]+[Gb(1,1) \times (\text{Gain}) \times W_{L2}]$$

The coefficients $W_{H1}$ and $W_{L1}$ illustrated in the calculation expression for the output [Gb (1)] are set according to the setting state of the coefficients described with reference to FIG. 9(1).

The coefficients $W_{H2}$ and $W_{L2}$ illustrated in the calculation expression for the output [Gb (2)] are set according to the setting state of the coefficients described with reference to FIG. 9(1).

When these coefficients are already calculated, the coefficients used to calculate the B pixel in the pixel information combination image, that is to say, the weight coefficients that are multiplied with the pixel B (p) and the pixel B (q) illustrated in FIG. 10, may be configured to be calculated using the coefficients $W_{H1}$ and $W_{L1}$ used in the calculation expression for the previously described [Gb (1)] and the coefficients $W_{H2}$ and $W_{L2}$ used in the calculation expression for the [Gb (2)].

For example, as the processing corresponding to step S11 in FIG. 8, the calculation expression for the intermediate combination pixel B (1) for B is as follows.

$$\text{Output}[B(1)]=[B(p) \times W_{Hb}]+[B(q) \times (\text{Gain}) \times W_{Lb}]$$

Thus the calculation expression is as described.

The coefficients $W_{Hb}$ and $W_{Lb}$ used in this expression are calculated as follows, for example.

$$W_{Hb}=(W_{H1}+W_{H2})/2$$

$$W_{Lb}=(W_{L1}+W_{L2})/2$$

In this way, the coefficient to give a weight to B may be configured to be calculated based on the coefficient Gb.

Processing to stabilize the weight coefficients without large change due to the color of each pixel of the output image, as a result, raises the contribution ratio of either the high sensitivity pixel information or the low sensitivity pixel information, depending on the color of each pixel of the output image. This is connected to the stabilization of the output image by making uniform the exposure time for the pixel regions, and as a result, this contributes to prevent the generation of false color due to variances in the exposure period such as when the physical object being photographed moves, or similar.

2-2. Second Embodiment

Next, as the second Embodiment of the present invention, a configuration and processing examples of an imaging device will be described as having a configuration in which one pixel is selected from the multiple pixels in the AD conversion circuit, and the setting of a pixel value for the output image is performed based on the selected pixel.

Figure 11:
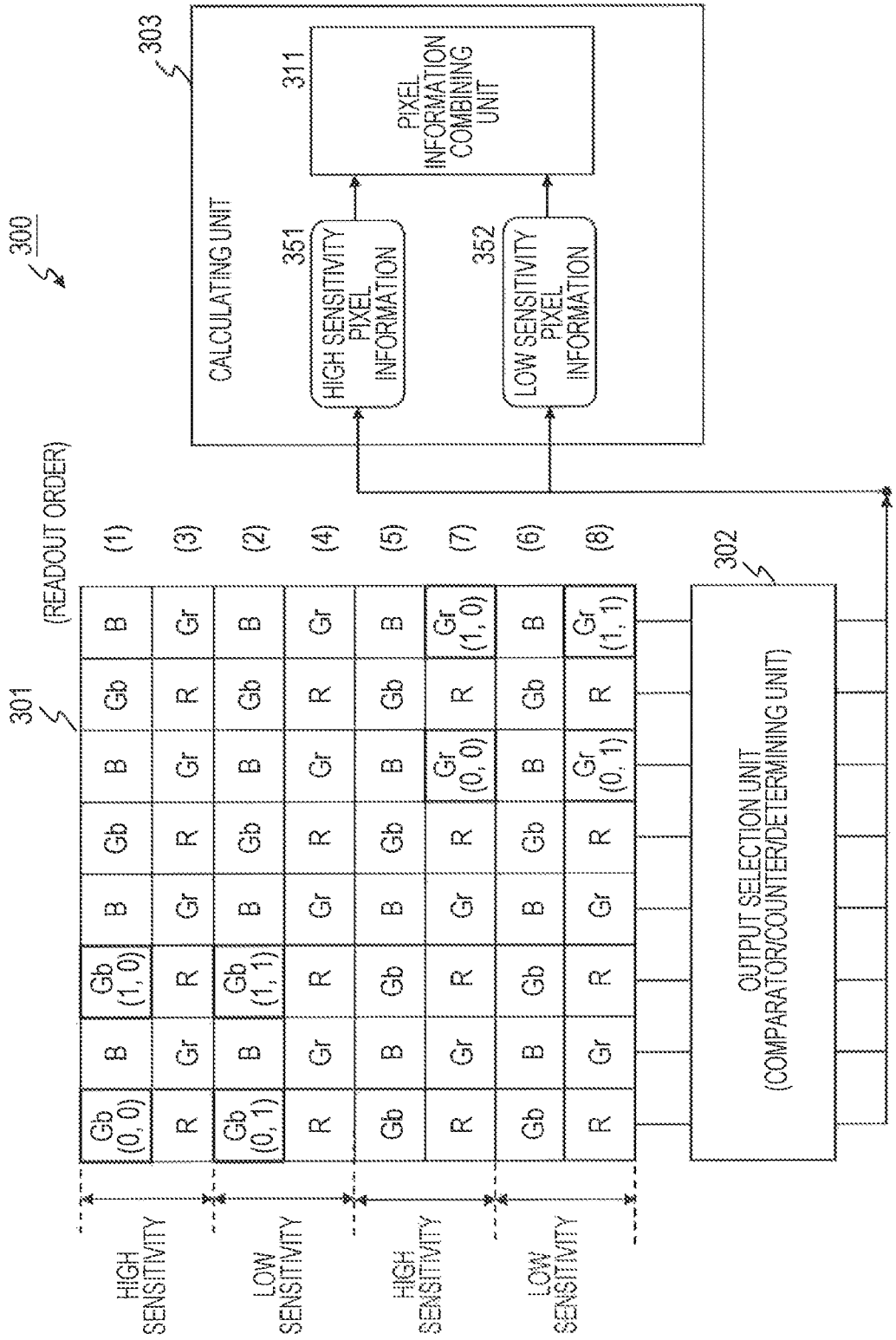
FIG. 11 is a diagram describing a configuration and processing for the imaging device of the image processing device related to a second Embodiment of the present invention.
Figure 12:
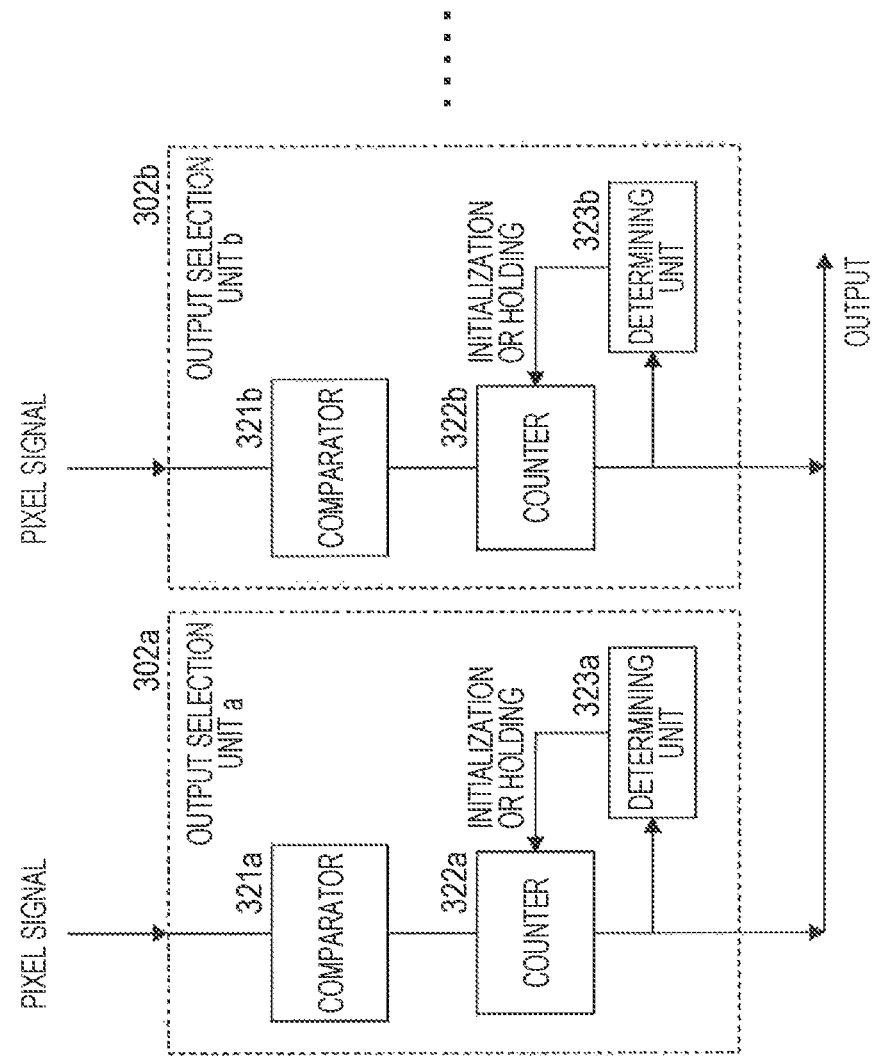
FIG. 12 is a diagram describing a configuration and processing of an output selection unit for the imaging device of the image processing device related to the second Embodiment of the present invention.

FIG. 11 is a diagram illustrating an example configuration of an imaging device 300 related to the second Embodiment of the present invention. The imaging device 300 includes a pixel portion 301, an output selection unit 302, and a calculating unit 303 as illustrated in the figure. The output selection unit 302 is configured as individual output selection units 302a, 302b, etc. corresponding to the output pixel from each column of the pixel portion 301 as illustrated in FIG. 12, and each output selection unit is configured to include a comparator 321, a counter 322, and a determining unit 323. The calculating unit 303 includes a pixel information combining unit 311.

Further, the overall configuration of the image processing device (imaging device) is similar to the first Embodiment, and has the configuration as previously described with reference to FIG. 2. Though not illustrated in FIG. 11, control signals from the control unit 105 are input into the pixel portion 301, the output selection unit 302, and the calculation unit 303, in which various types of control are executed.

The configuration and processing of the pixel portion 301 are similar to the first Embodiment, in which the high sensitivity pixel rows with a long exposure, and the low sensitivity pixel rows with a short exposure are set in units of two rows.

The exposure processing is similar to the first Embodiment, in which the shutter control is performed similarly to as previously described with reference to FIG. 6, and so the high sensitivity pixel rows with a long exposure, and the low sensitivity pixel rows with a short exposure are set in units of two rows.

However, according to the present embodiment, the readout sequence of the accumulated electrical charges after exposure is different from the previous first Embodiment.

According to the previous first Embodiment and as described with reference to FIG. 6, the readout of each row from the first to the second, third, fourth, fifth, etc. is performed in order from the top.

In contrast, according to the second Embodiment and as illustrated in FIG. 11, the readout order is set as follows.
First row (high sensitivity pixel row),
Third row (low sensitivity pixel row),
Second row (high sensitivity pixel row),
Fourth row (low sensitivity pixel row),
Fifth row (high sensitivity pixel row), Seventh row (low sensitivity pixel row),
Sixth row (high sensitivity pixel row),
and so on.

The readout processing is executed from the top alternating between the high sensitivity pixel rows and the low sensitivity rows as previously described.

In this way, the readout pixel values (accumulated electrical charges) are output to the comparator 321 of the output selection unit 302 sequentially. The comparator 321 sequentially inputs the high sensitivity pixel value and the low sensitivity pixel value of the same color for each column.

For example, regarding the left edge column (first column), first the [Gb (0,0)] in the first row, which is the high sensitivity pixel row, is input, and next the [Gb (0,1)] of the same color in the third row, which is the low sensitivity pixel row, is input. Similarly, for the second column, the [B] in the first row, which is the high sensitivity pixel row is input, and next the [B] of the same color in the third row, which is the low sensitivity pixel row, is input.

In this way, the pixel values of the same color are input into the comparator 321 for each column, with the high sensitivity pixel value input first, and the low sensitivity pixel value is input afterwards.

The comparator 321 generates digital data based on the output electrical charges from each pixel, and outputs this to the counter 322. According to the present embodiment, a setting in which a 10-bit (0 through 1032) digital pixel value for each signal may be output will be described.

Pixel value=0 through 1023

The comparator 321 sets the digital data to a value within this range for each pixel corresponding to the output electrical charge from each pixel, and outputs this to the counter 322.

First, the comparator 321 generates digital data representing the pixel value of the high sensitivity pixel, outputs this to the counter 322, and then outputs the digital data representing the pixel value for the low sensitivity pixel of the same color to the counter 322.

First, the counter 322 counts the digital value of the high sensitivity pixel input from the comparator 321.

The determining unit 323 determines whether the digital value of the high sensitivity pixel first input from the comparator 321 is at or above 512, which is half of the value of the 10-bit number (0 through 1032). When the digital value of the high sensitivity pixel is at or above 512, the high sensitivity pixel information, that is to say the digital data representing the pixel value of the high sensitivity pixel, is discarded (initialized).

Next, the low sensitivity pixel value is read out, and the pixel information for the low sensitivity pixel is input as a digital value into the counter 322. This digital value is then output.

In contrast, if the digital value for the high sensitivity pixel is less than 512, the counter 322 holds the high sensitivity pixel information as it is, and is set as to not be overwritten by the low sensitivity pixel information.

When the digital value for the high sensitivity pixel is at or above 512 for this processing, there is a potential that the high sensitivity pixels are saturated, and as the low sensitivity pixel information is also determined to be good, the high sensitivity pixel information is discarded, and the low sensitivity pixel information is input into the counter 322.

In contrast, when the digital value for the high sensitivity pixel is less than 512, there is no potential that the high sensitivity pixels are saturated, and as the low sensitivity pixel information is also determined to be poor, the high sensitivity pixel information is held in the counter 322 as it is.

Further, as previously described, the determination threshold for determining which value to select has been described as half of the pixel value, but the threshold value may be determined by the properties of the imaging elements, and so on.

In this way, the selection of the pixel information is performed with the comparator 321, the counter 322, and the determining unit 323 as the output selection unit configured in the AD conversion circuit unit, and afterwards, the pixel information in a horizontal direction is combined similar to the previously described first Embodiment (the processing of step S12 in FIG. 8), and one image information is output.

Further, the selection in a vertical direction may be performed within the imaging element, or the vertical direction may be processed by an LSI external to the imaging element.

Figure 13:
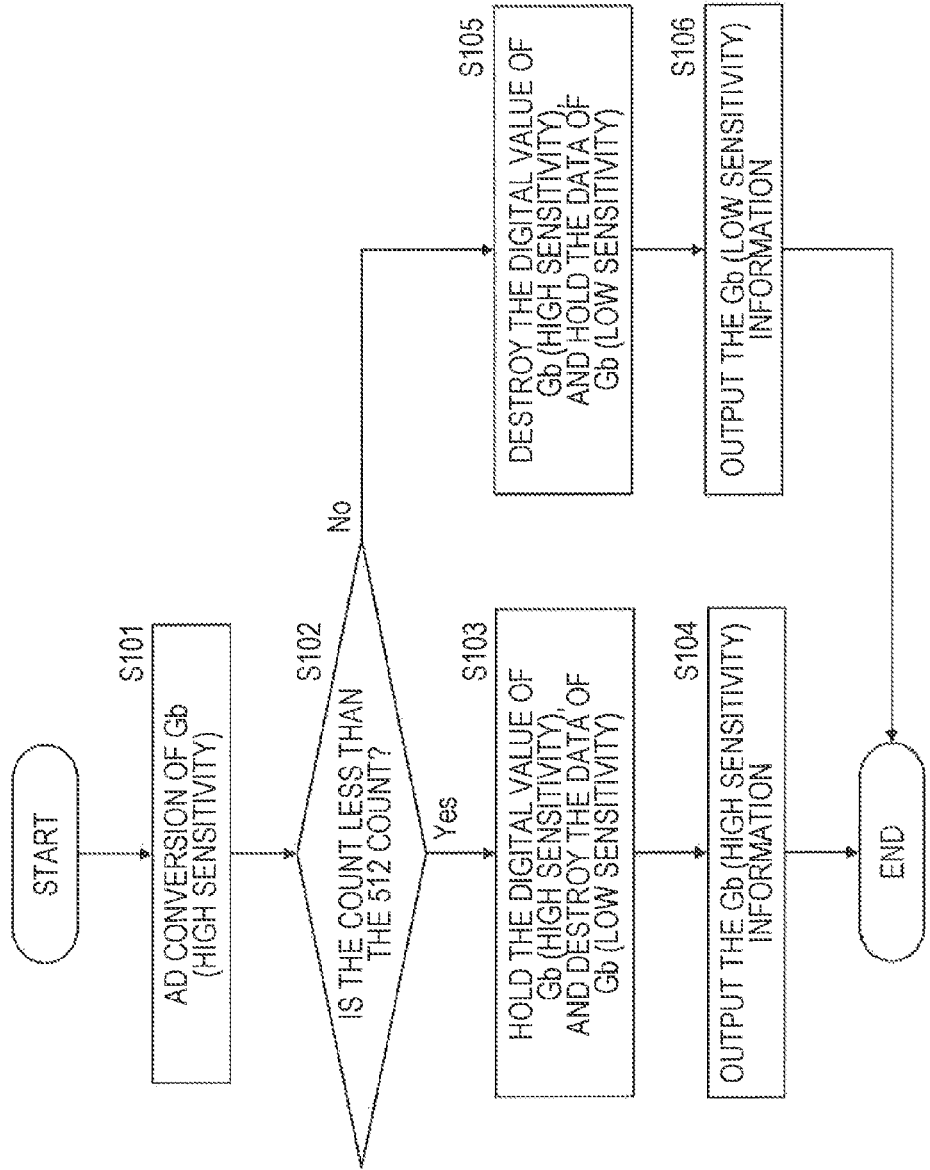
FIG. 13 is a diagram illustrating a flowchart describing a pixel value determination sequence for the images combined from pixel information executed in the imaging device of the image processing device related to the second Embodiment of the present invention.

The flowchart illustrated in FIG. 13 describes the sequence of the pixel value selection processing of the imaging device 300 related to the second Embodiment of the present invention illustrated in FIG. 11.

First, at a step S101, the comparator 321 generates digital data for the pixel value of the high sensitivity pixel read out from the pixel portion 301. Further, the flow illustrated in FIG. 13 is described as an example of the readout processing of the Gb pixel.

At a step S102, the counter 322 counts the digital data of the pixel value for the high sensitivity pixel input from the comparator 321, and determines whether it is less than 512, which is half of the 10-bit value (0 through 1023).

When the digital data of the pixel value for the high sensitivity pixel is less than 512, processing proceeds to step S103, and in contrast, when at or above 512, processing proceeds to step S105.

When the digital data of the pixel value for the high sensitivity pixel is less than 512, processing proceeds to step S103, the digital data of the pixel value for the high sensitivity pixel is held, and this is set not to be overwritten by the data corresponding to the pixel value of the low sensitivity pixel for the same color, which is the next input value.

Next, processing proceeds to step S104, and the digital value of the pixel value for the high sensitivity pixel is output.

In contrast, at the step S102, when the digital data of the pixel value for the high sensitivity pixel is at or above 512, processing proceeds to step S105, the data corresponding to the pixel value for the high sensitivity pixel is discarded, and the digital value corresponding to the pixel value for the low sensitivity pixel of the same color, which is the next input value, is held.

Next, processing proceeds to step S106, and the digital value of the pixel value for the low sensitivity pixel is output.

In this way, according to the present embodiment, the pixel value for the high sensitivity pixel and the pixel value for the low sensitivity pixel for the same color is read out from the pixel portion, if the pixel value for the high sensitivity pixel, which is read out first, is less than a specified threshold (the value which is half of the maximum value, for example), the pixel value for the high sensitivity pixel is selected and output, and if the pixel value for the high sensitivity pixel, which is read out first, is at or above a specified threshold (the value which is half of the maximum value, for example), the pixel value for the low sensitivity pixel is selected and output.

As a result of this processing, the pixel value for the low sensitivity pixel is selected and output for bright pixel regions, the pixel value for the high sensitivity pixel is selected and output for comparatively dark pixel regions, saturated pixel values and pixel values with poor SN ratios are discarded, and so the pixel value with high accuracy may be selected, and the pixel value for the output pixel may be determined.

2-3. Third Embodiment

Next, as the third Embodiment of the present invention, a configuration of a gradation conversion unit after the pixel information combining unit will be described with reference to FIG. 14.

Figure 14:
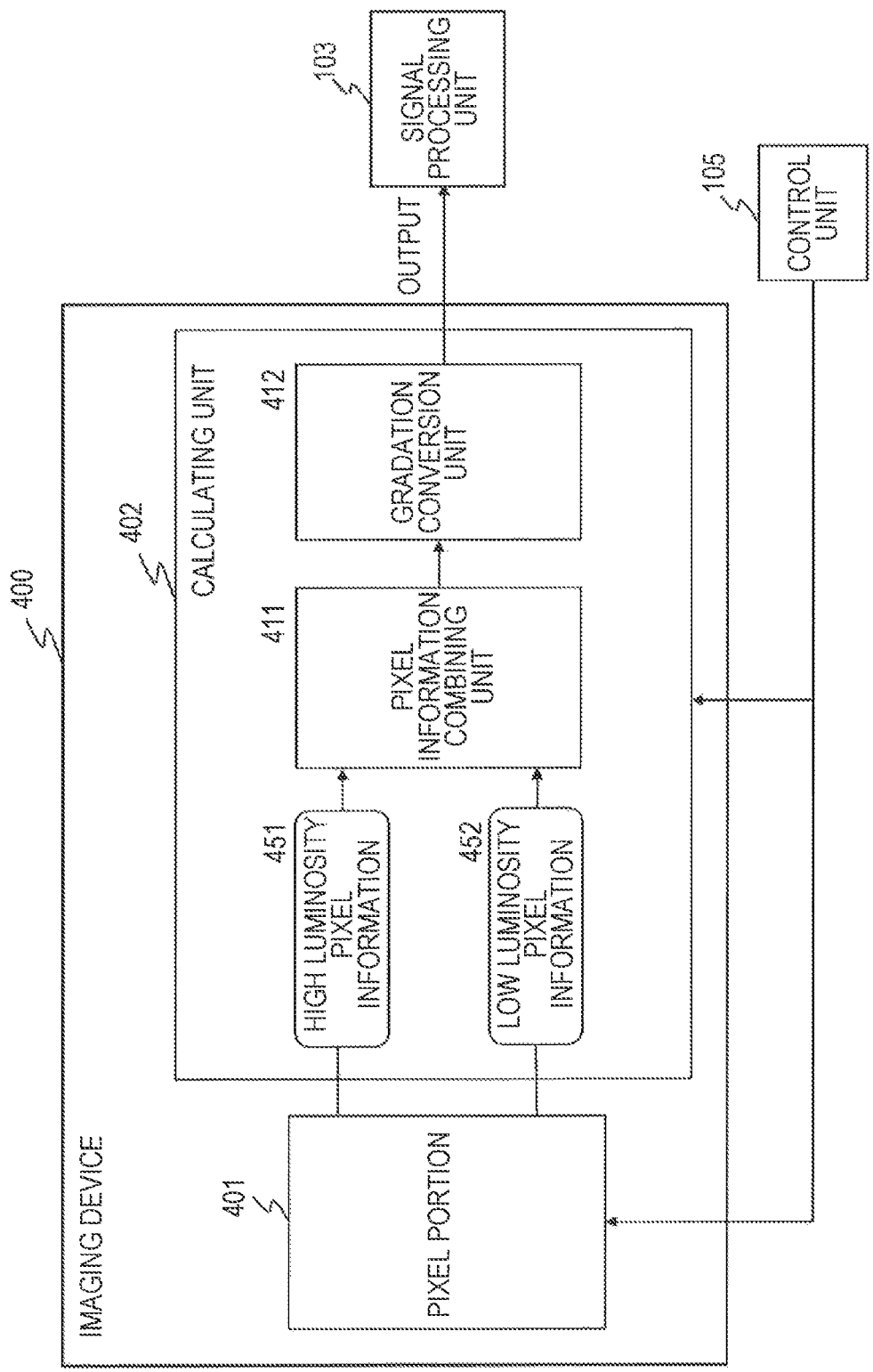
FIG. 14 is a diagram describing a configuration and processing of an imaging device of the image processing device related to a third Embodiment of the present invention.

FIG. 14 is a diagram illustrating a configuration of an imaging device 400 related to the third Embodiment. The configuration illustrated in FIG. 14 has a gradation conversion unit 412 provisioned on the downstream side of the imaging device illustrated in FIG. 3 previously described as the first Embodiment. Other configurations are the same as the configurations for the first Embodiment as illustrated in FIG. 3. Further, the overall configuration of the image processing device (imaging device) is similar to the first Embodiment, and has the configuration previously described with reference to FIG. 2.

Regarding the imaging device 400 illustrated in FIG. 14, a pixel portion 401 includes a Bayer array of RGbGrB pixels as previously described with reference to FIG. 4 for the first Embodiment, for example, and under the control of the control unit 105, the long exposures and the short exposures are executed in units of two rows. The exposure sequence is performed according to the sequence illustrated in FIG. 6 according to the first Embodiment.

The pixel portion 401 is set into different exposure times in units of pixel regions (for example units of rows (or lines)) by the control from the control unit 105 (shutter control), a high sensitivity pixel information 451, which is the accumulated electrical charge based on the long exposure from the row having a long exposure, is output. Also, a low sensitivity pixel information 452, which is the accumulated electrical charge based on the short exposure from the row having a short exposure, is output.

A calculating unit 402 inputs the high sensitivity pixel information 451 and the low sensitivity pixel information output from the pixel portion 401, and generates a pixel information combination image at a pixel information combining unit 411, based on this input information. This combination processing is performed in the same way as the combination processing described with reference to FIG. 4, and FIGS. 7 through 10 for the first Embodiment. That is to say, the high sensitivity pixel information and the low sensitivity pixel information of the same color is input, and the previously described (Expression 1) or (Expression 2) through (Expression 4) are applied to execute the pixel value calculation of the pixel information combination image and generate the pixel information combination image.

According to the third Embodiment, the gradation conversion unit 412 is provisioned after this pixel information combining unit 411.

The gradation conversion unit 412 converts the gradation of the pixel value of each pixel for the pixel information combination image (FIG. 4(b) for example) generated by the pixel information combining unit 411. Specifically, when the pixel value of each pixel for the pixel information combination image generated by the pixel information combining unit 411 has a gradation of 14 bits (0 through 16383), processing is performed to convert and output the gradation of the pixel value of each pixel to 10 bits (0 through 1023). That is to say, an image is generated and output after reducing the bit count for each pixel.

Images with a wide dynamic range generated by the combination of long exposure images and short exposure images tend to increase the bit count of the information for each pixel. For example, for imaging elements that normally operate at 10 bits, when a sensitivity ratio of 16 times is added internally, and an image with a wide dynamic range that has a value 16 times larger is generated, the value becomes a 14-bit number. There are cases in which images that have bit counts increased in this way may not be processable by the DSP, which is a down-stream signal processing unit. In order to prevent this kind of situation, the gradation conversion unit 412 executes gradation conversion processing to compress the bit count of each pixel to bit level that may be processed by the DSP, which is a down-stream signal processing unit.

Figure 15:
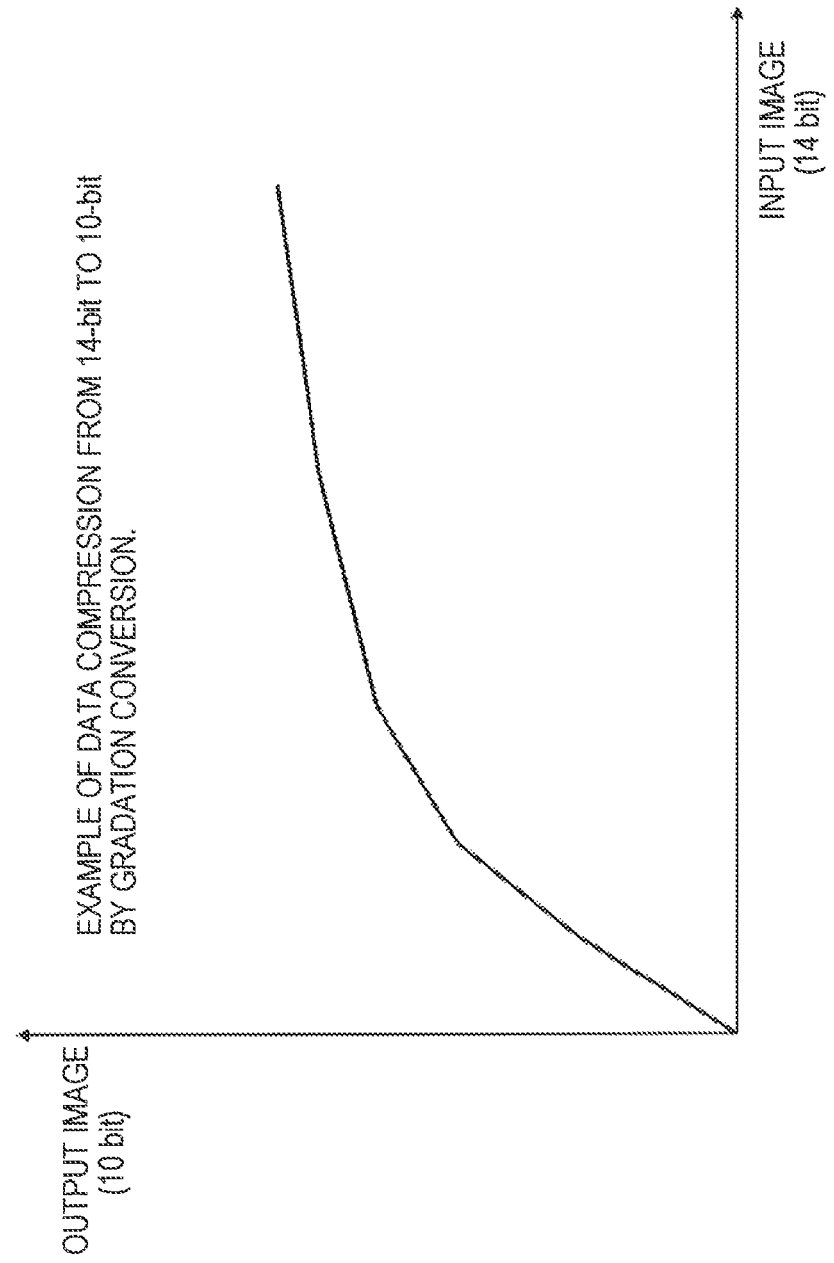
FIG. 15 is a diagram describing a specific example of processing executed by the gradation conversion unit set in the imaging device of the image processing device related to the third Embodiment of the present invention.

An example of the bit count compression processing executed by the gradation conversion unit 412 will be described with reference to FIG. 15. In FIG. 15, the horizontal axis represents a gradation (14-bit (0 through 16383) of each pixel of the input image for the gradation conversion unit 412, and the vertical axis represents a gradation [10-bit (0 through 1023)] of each pixel of the output image from the gradation conversion unit 412. In this way, the gradation conversion unit 412 performs processing to reduce the bit count smaller than that of the multi-gradation pixel values output from the pixel information combining unit 411.

Supplying the image data after this gradation conversion, an image formed from 10-bit data of each pixel, for example, to a down-stream signal processing unit 103 (DSP), enables processing at the signal processing unit 103 (DSP) without problem.

Further, the bit count compression processing executed by the gradation conversion unit 412 uses a function, for example, to reduce the bit count. This function may be previously determined, or a function corresponding to the image may be input from an external device, or may be calculated internally.

2-4. Fourth Embodiment

Next, as the fourth Embodiment of the present technology, an embodiment will be described in which a signal processing unit for executing camera signal processing such as demosaic and noise reduction (NR) and a codec for executing image compression processing (JPEG and such) is provisioned after the gradation conversion unit according to the third Embodiment, with reference to FIG. 16.

Figure 16:
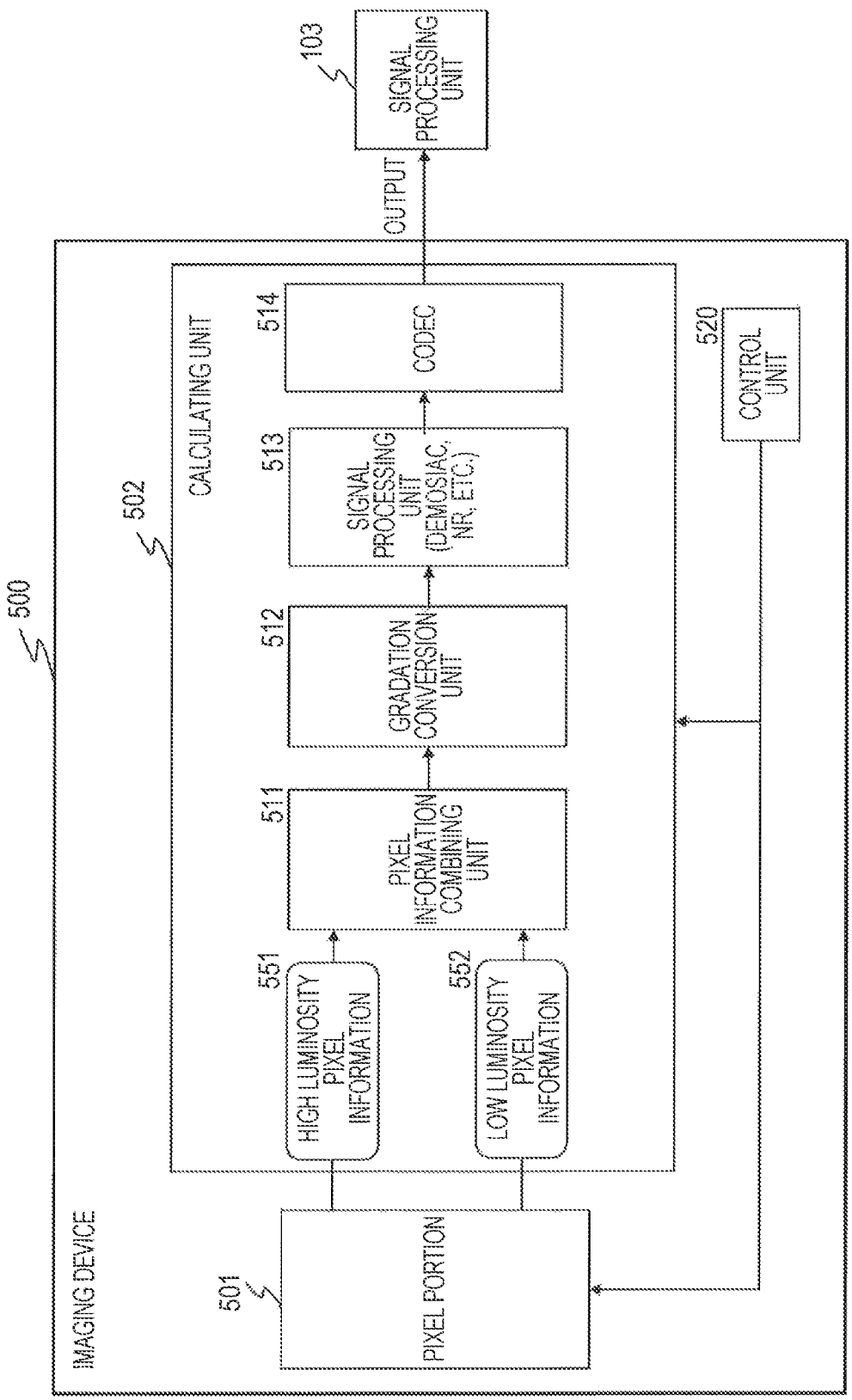
FIG. 16 is a diagram describing a configuration and processing for the imagine device of the image processing device related to a fourth Embodiment of the present invention.

FIG. 16 is a diagram illustrating a configuration of an imaging device 500 related to the fourth Embodiment. The configuration illustrated in FIG. 16 provisions a signal processing unit 513 for executing camera signal processing such as demosaic and noise reduction (NR) and a codec 514 for executing image compression processing (JPEG and such) after the gradation conversion unit according to the third Embodiment imaging device illustrated in FIG. 3. Further, the overall configuration of the image processing device (imaging device) has, similar to the configuration of the first Embodiment, a configuration previously described with reference to FIG. 2, or a configuration has the signal processing unit 103 has been omitted from the configuration in FIG. 2.

When all of the processing executed by the signal processing unit 103 in the configuration in FIG. 2 is executed by the signal processing unit 513 in FIG. 16, the downstream signal processing unit 103 may be omitted. When executing different processing at the different signal processing units, the configuration may include two signal processing units.

Regarding the imaging device 500 illustrated in FIG. 16, a pixel portion 501 includes a Bayer array formed from the R, Gb, Gr, and B pixels as previously described with reference to FIG. 4 for the first Embodiment, for example, and under control of a control unit 520, the long exposures and the short exposures are executed in units of two rows. The exposure sequence is performed according to the sequence illustrated in FIG. 6 according to the first Embodiment. According to the present embodiment, the example illustrated has the control unit 520 set in the imaging device.

The pixel portion 501 is set to different exposure times in units of pixel regions (for example units of rows (or lines)) by the control from the control unit 520 (shutter control). A high sensitivity pixel information 551, which is the accumulated electrical charge based on the long exposure is output from the row having a long exposure. Also, a low sensitivity pixel information 552, which is the accumulated electrical charge based on the short exposure is output from the row having a short exposure.

A calculating unit 502 inputs the high sensitivity pixel information 551 and the low sensitivity pixel information output from the pixel portion 501, and generates a pixel information combination image at a pixel information combining unit 511, based on this input information. This combination processing is performed in the same way as the combination processing described with reference to FIG. 4, and FIGS. 7 through 10 for the first Embodiment. That is to say, the high sensitivity pixel information and the low sensitivity pixel information of the same color is input, and the previously described (Expression 1) or (Expression 2) through (Expression 4) are applied to execute the pixel value calculation of the pixel information combination image and generate the pixel information combination image.

According to the fourth Embodiment, the gradation conversion unit 512 according to the third Embodiment, the signal processing unit 513 for executing camera signal processing such as demosaic and noise reduction (NR), and the codec 514 for executing image compression processing (JPEG and such) are provisioned after the pixel information combining unit 511. By implementing these kinds of functions, a signal processing unit downstream from the imaging element may be omitted, or alternatively may be simplified.

2-5. Fifth Embodiment

Next, as the fifth Embodiment of the present invention, a new embodiment of exposure control of the pixel portion in the imaging device will be described.

According to the first Embodiment previously described with reference to FIG. 4, the configuration set a high sensitivity pixel region for executing long exposure processing in units of two rows of the pixel portion and a low sensitivity pixel region for executing short exposure processing in units of two rows of the pixel portion.

That is to say, a setting was established to execute exposure processing individually on only one of either the long exposure or the short exposure for each row.

The fifth Embodiment is a configuration which enables the setting of either the long exposure processing or the short exposure processing in units of color signals (R, Gr, Gb, and B) for each row, based on the control signals, without setting exposure time fixed in units of these rows.

Figure 17:
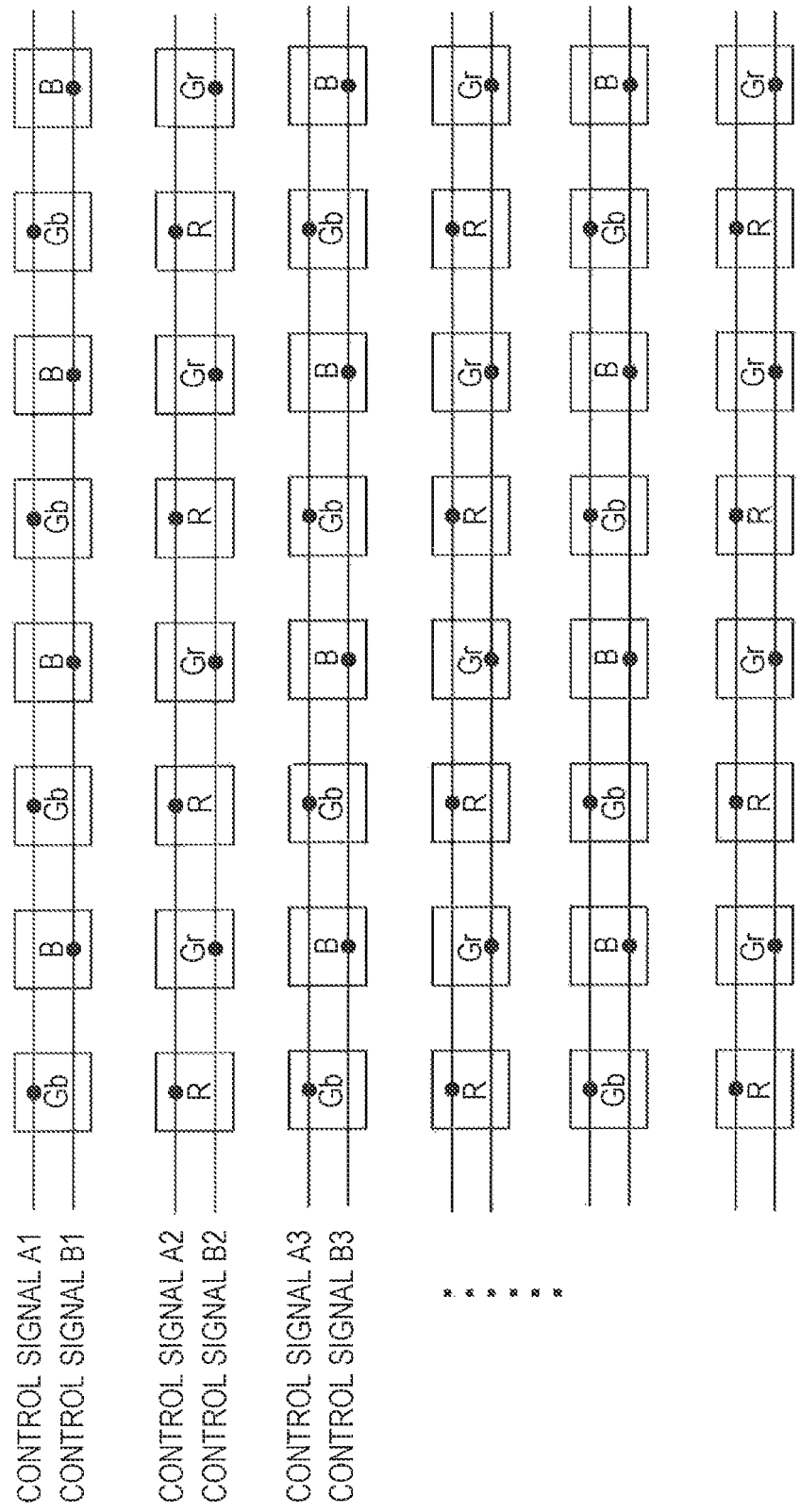
FIG. 17 is a diagram describing a configuration of a pixel portion and the exposure control processing for the imaging device of the image processing device related to a fifth Embodiment of the present invention.

FIG. 17 illustrates a configuration example of the pixel portion of the imaging device related to the present embodiment.

As illustrated in FIG. 17, each of the configuration pixels of the pixel portion (R, Gr, Gb, and B) is connected by two control lines. These lines represent each line of a control signal A and a control signal B.

The control signals are control signals input from the control unit, and as illustrated in FIG. 17, for the first, third, fifth, and all odd-numbered rows, the control signals A1, A3, A5, etc. are connected to the Gb pixel, and the control signals B1, B3, B5, etc. are connected to the B pixel.

Also, for the second, fourth, sixth, and all even-numbered rows, the control signals A2, A4, A6, etc. are connected to the R pixel, and the control signals B2, B4, B6, etc. are connected to the Gr pixel.

In this way, the configuration uses the control lines as the control signal for only one color.

Further, this kind of control signal connection configuration corresponding to color is described in Non Patent Literature "ISSCC 2006 Dig. Tech. Papers, pp. 492-493 (2)", and control by control signals corresponding to each pixel is enabled by using the configuration described in this literature.

According to the fifth Embodiment, exposure time control is executed corresponding to each color by the control signals corresponding to each color.

Any of the control signals A1 through An and B1 through Bn illustrated in FIG. 17 may be set as optional control signals at the control unit 105 (refer to FIG. 3), which enables the setting of various exposure times.

Specifically, (1) A timing control signal that starts the exposure and stops the exposure (readout start) for the long exposure control, (2) A timing control signal that starts the exposure and stops the exposure (readout start) for the short exposure control, either of these control signal may be set as the control signals A1 through An and B1 through Bn.

Also, the setting is not limited to the two exposure times, the long exposure and the short exposure, and so the exposure time may be changed in units of color.

That is to say, control in units of each color of the pixel portion is enabled, and an optimum sensitivity may be selected for each color to generate the output image.

Figure 18:
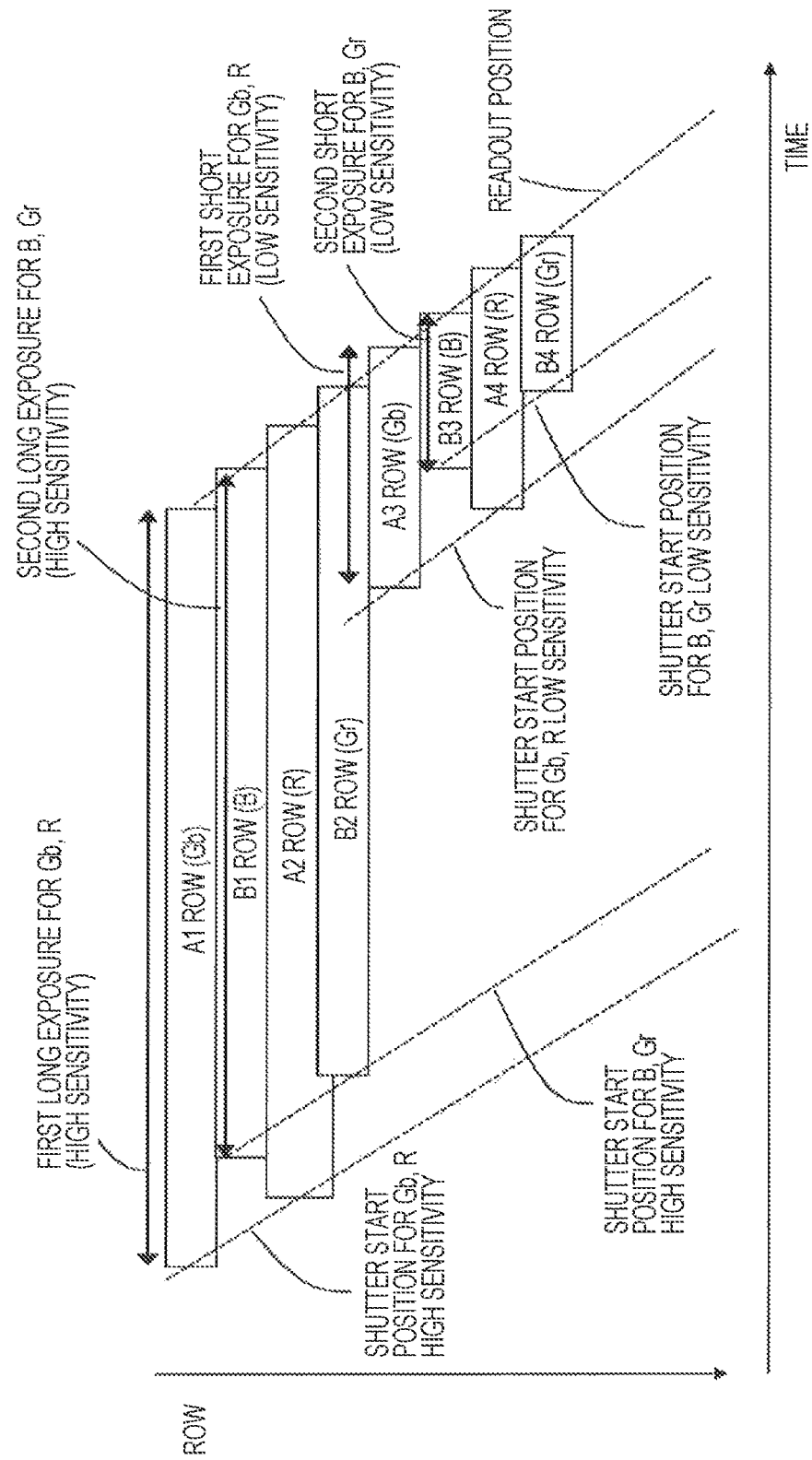
FIG. 18 is a diagram describing a specific example of the exposure control processing of the pixel portion for the imaging device of the image processing device related to the fifth Embodiment of the present invention.

A specific example of the exposure time control will be described with reference to FIG. 18. FIG. 18 is a diagram corresponding to the exposure time control example previously described with reference to FIG. 6 for the first Embodiment. The vertical axis represents pixel rows of the pixel portion, and the horizontal axis represents elapsed time. The rows in the vertical axis start at the top with the first row of the pixel portion, and descend in order to the lower rows (row number=2, 3, 4, 5, . . . ).

According to the example described with reference to FIG. 6, rows 1 through 2, rows 5 through 6, rows 9 through 10, and so on are set as the high sensitivity pixel regions to receive long exposure processing, and rows 3 through 4, rows 7 through 8, rows 11 through 12, and so on are set as the low sensitivity pixel regions to received short exposure processing, and the pixel included in one row were all set with the same exposure time.

In contrast, according to the present embodiment, different exposure time control may be set in units of each color R, Gr, Gb, and B. A specific example is illustrated in FIG. 18.

In the example illustrated in FIG. 18, a first long exposure time and a first short exposure time are set for Gb and R, a second long exposure time and a second short exposure time are set for Gr and B, and so the long exposure time and the short exposure time set for Gb and R is different from the long exposure time and the short exposure time set for Gr and B.

Further, in FIG. 18, a color pair Gb and R and a color pair Gr and B are set, and the single pair is a combination of two colors that have the same exposure time, but the setting of the long exposure time and the short exposure time may be different for each color R, Gr, Gb, and B.

In this way, by applying the present embodiment, control in units of each color in the pixel portion is enabled, and an optimum sensitivity may be selected for each color to generate the output image.

2-6. Sixth Embodiment

Next, as the sixth Embodiment of the present invention, a new configuration example of the pixel portion in the imaging device will be described.

Figure 19:
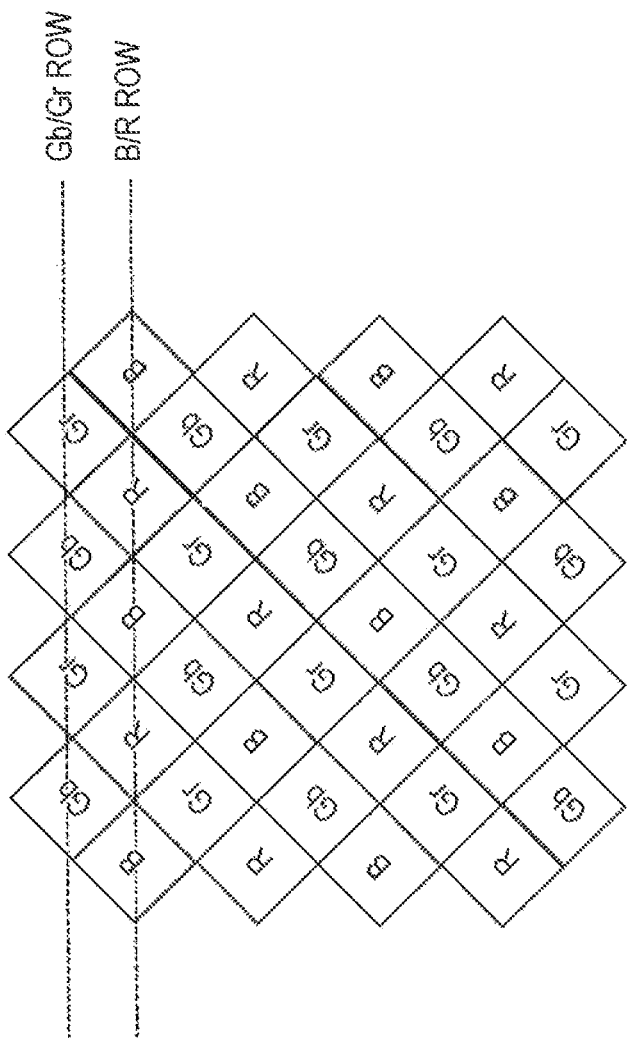
FIG. 19 is a diagram describing a configuration of the pixel portion and the exposure control processing for the imaging device of the image processing device related to a sixth Embodiment of the present invention.

FIG. 19 illustrates a configuration example of a pixel portion in the imaging device of the sixth Embodiment.

The pixel array (array structure) illustrated in FIG. 19 is the array of the pixel portion described with reference to FIG. 4(a) for the first Embodiment rotated by 45 degrees.

Exposure time control is performed in units of rows corresponding to the array illustrated in FIG. 19.

As illustrated in FIG. 19, the first row is configured with Gb and Gr pixels, the second row is configured with B and R pixels, and for the third row, the fourth, the fifth row, and so on downward, this pattern in which rows are configured with Gb and Gr pixels alternate with rows configured with B and R pixels repeats.

If the exposure control is executed in units of rows corresponding to the pixel array illustrated in FIG. 19, the exposure time control may be executed in units of color pixel pairs previously described, which is the grouping of the Gb and Gr and the grouping of the B and R.

2-7. Seventh Embodiment

Next, as the seventh Embodiment of the present embodiment, a modification example of the exposure control and the combination processing by the pixel information combining unit of the imaging device will be described.

Figure 20:
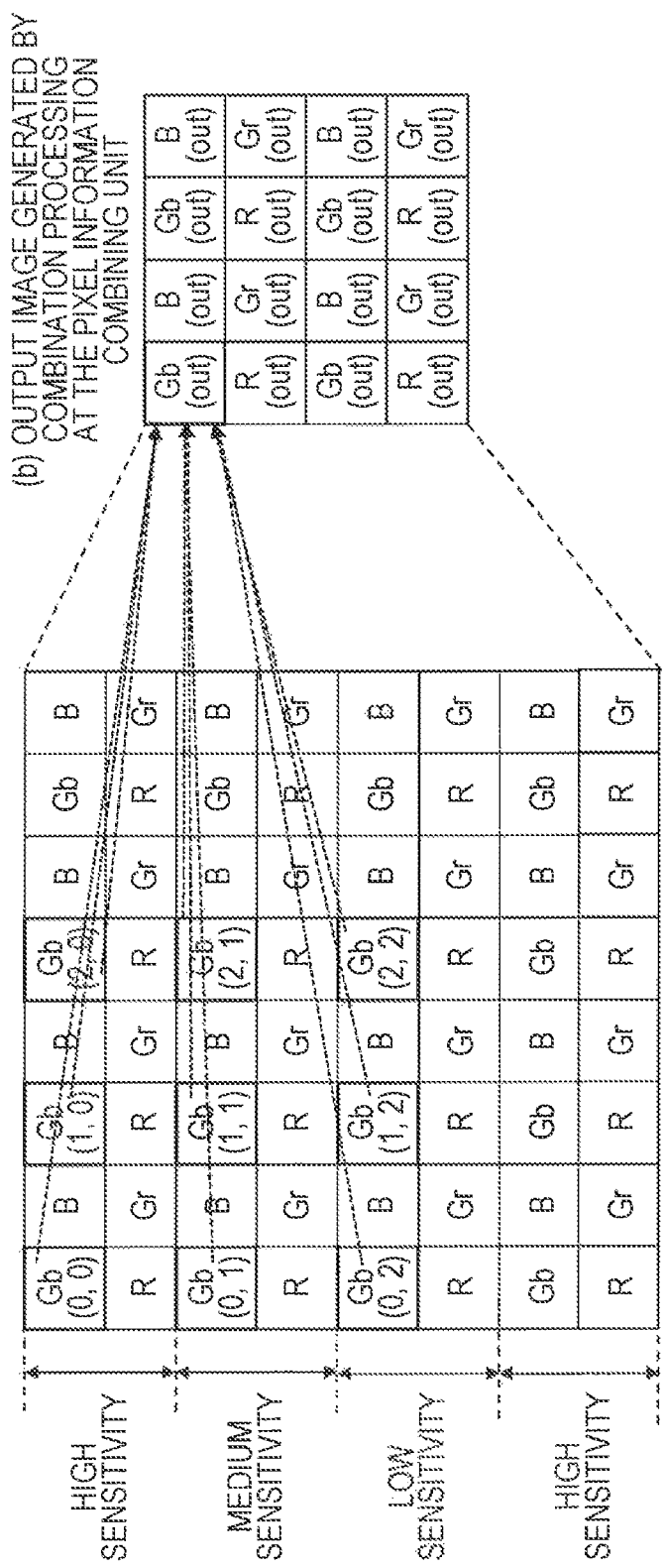
FIG. 20 is a diagram describing a configuration and a pixel information combining processing for the imaging device of the image processing device related to a seventh Embodiment of the present invention.

FIG. 20 illustrates an example of exposure control and combination processing of the imaging device of the seventh Embodiment.

FIG. 20 is similar to FIG. 4 of the previously described first Embodiment, and illustrates (a) Photographed image of the pixel portion and (b) Output image generated by the combination processing by the pixel information combining unit.

Further, both (a) and (b) are diagrams illustrating only a partial region of the photographed image or the pixel information combination image.

According to the previous first Embodiment, the configuration set a high sensitivity pixel region in which long exposure processing is executed and a low sensitivity pixel region in which short exposure processing is executed in units of two rows of the pixel portion.

According to this seventh Embodiment and as illustrated in FIG. 20(a), the first through second rows are a high sensitivity pixel regions in which long exposure is performed, the third through fourth rows are a medium sensitivity pixel region in which medium exposure is performed, the fifth through sixth rows are a low sensitivity pixel region in which a short exposure is performed, and so for the rows that follow, the configuration repeats the high sensitivity pixel region, the medium sensitivity pixel region, and the low sensitivity pixel region in units of two rows.

The imaging device configuration of the present embodiment is the same as that of the first Embodiment, and includes the configuration illustrated in FIG. 3.

The pixel information combining unit inputs three of each type of pixel, the high sensitivity pixel, the medium sensitivity pixel, and the low sensitivity pixel of the same color, and the pixel value for one output pixel of the pixel information combination image is determined based on the total pixel value of these 9 pixels.

For example, as illustrated in FIG. 20, when determining the pixel value of one pixel Gb (out) of the pixel information combination image in FIG. 20(b), the pixel values are input as follows.

(1) High sensitivity pixels: Gb (0,0), Gb (1,0), Gb (2, 0)
(2) Medium sensitivity pixels: Gb (0,1), Gb (1,1), Gb (2, 1)
(3) Low sensitivity pixels: Gb (0,2), Gb (1,2), Gb (2,2)

The pixel information combining unit calculates the pixel value Gb (out) for one pixel of the pixel information combination image, based on the pixel values of these 9 pixels.

The pixel information combining unit calculates the pixel value of the Gb (out) illustrated in FIG. 20(b), for example, according to the following expression (Expression 1).

$$Gb(\text{out}) = [Gb(0,0) \times k1] + [Gb(1,0) \times k2] + [Gb(2,0) \times k3] + [Gb(0,1) \times (\text{Gain 1}) \times k4] + [Gb(1,1) \times (\text{Gain 1}) \times k5] + Gb(2,1) \times (\text{Gain 1}) \times k6] + [Gb(0,2) \times (\text{Gain 2}) \times k7] + [Gb(1,2) \times (\text{Gain 2}) \times k8] + Gb(2,2) \times (\text{Gain 2}) \times k9]$$

(Expression 5)

where Gb (x,y) are the pixel values of the photographed image at the position of the coordinates (x,y), Gain 1 and Gain 2 are the gain values for compensating sensitivity ratios (predetermined values), k1 through k9 are coefficients for setting the contribution ratio of the input pixels, and are coefficients that satisfy a relationship in which k1+k2+k3+k4+k5+k6+k7+k8+k9=1.

Further, the setting of the coefficients k1 through k9 may be performed by processing to set the setting value corresponding to the brightness of the photographic subject, for example.

According to the present embodiment, the configuration uses the pixel values of nine pixels including high sensitivity pixels, medium sensitivity pixels, and low sensitivity pixels included in the photographed image to perform the calculation processing for the pixel value of one pixel of the pixel information combination image. By using pixel values with three levels of sensitivity, an optimum pixel value corresponding to brightness, for example, may be calculated.

2-8. Eighth Embodiment

Next, as the eighth Embodiment of the present invention, a modification example of the pixel portion in the imaging device will be described.

According to the first Embodiment and as previously described with reference to FIG. 4, an example configuration has been described using a Bayer array formed from the R, Gr, Gb, and B pixels.

The image processing device of the present invention may also support a configuration including a pixel portion formed with an array different from this Bayer array. FIG. 21 illustrates an example of such a pixel array.

The pixel array illustrated in FIG. 21 is a pixel array of RGBW pixels. Here, W represents transparency (white).

When performing the combination processing on an image, regarding the W pixels and the G pixels, two each of the high sensitivity pixels for a total of four pixels are input, similar to the previous description with reference to FIG. 4, for which calculation is performed according to the previously described (Expression 1).

However, the R and B pixels in a 3×3 pixel region as illustrated in FIG. 21 only include one of each pixel for the high sensitivity pixel and the low sensitivity pixel, and so the output pixel value of the image information combination image is calculated based on the pixel value of one high sensitivity pixel and one low sensitivity pixel.

Even when performing the pixel information combination processing applied to the RGBW array related to the present embodiment, at least one pixel each of the high sensitivity pixels and the low sensitivity pixels are input, and the pixel value of the pixel information combination image is determined by applying the pixel values with these different sensitivities. For example, when the photographic subject is bright and the high sensitivity pixels are saturated, the pixel values of the low sensitivity pixels are used to determine the pixel values of the pixel information combination image, and when the photographic subject is dark and the SN ratio for the pixel values of the low sensitivity pixels is poor, processing is performed such as using the pixel values for the high sensitivity pixels, setting a large weight and performing blending, or the like.

As a result of this kind of processing, an image with a wide dynamic range may be generated and output in which pixel values have been set with a higher accuracy.

The present technology has been described in detail with reference to specific embodiments. However, it should be obvious that those skilled in the art may make modifications or substitutions to the embodiments without departing from the essence of the present invention. That is to say, the embodiments are examples used to disclose the present invention, and should not be interpreted as restrictive. To determine the essence of the present invention, the section of the claims should be referenced.

Also, the series of processing described through the specification may be executed by hardware, software, or a combined configuration of the two. When executing the processing by software, a program in which the processing sequence has been recorded can be installed to and executed at memory in a computer composed of specialized hardware, or may be a program installed to and executed from a general purpose computer that can execute the various processing. For example, the program may be recorded in advance on a recording medium. In addition to installing onto a computer from a recording medium, the program can be received via a network such as a LAN (Local Area Network) or the Internet, and can be installed to a recording medium such as an internal hard disk.

Further, the various processing described in the specification is not limited to being executed in sequential order according to the description, the processing may be executed in parallel as desirable or corresponding to the processing capabilities of the device that executes the processing, or may be executed individually. Also, the system in the present specification is a logically grouped configuration of multiple devices, and the devices of each configuration are not limited to being the same physical housing.

INDUSTRIAL APPLICABILITY

According to the configuration of the first Embodiment present invention and as previously described, a device and method are realized to generate an image with a wide dynamic range based on one photographed image. Specifically, an exposure time control is executed in which different exposure times are set in units of rows of a pixel portion, in units of pixel regions, and multiple, different pixel information which is the pixel values of the pixels set with different exposures is obtained. For example, high sensitivity pixel information is obtained from long exposure pixels, and a low sensitivity information is obtained from short exposure pixels, and a pixel value for the output image is calculated based on the pixel information with these different sensitivities. For example, for high luminosity regions, the sensitivity pixel information may have a saturated value, and so a large weight is set to the low sensitivity pixel information, and also for low luminosity regions, the SN ratio of low sensitivity pixel information is estimated to be poor, and so a large weight is set to the high sensitivity pixel information to determine the output pixel value.

As a result of this processing, the generation of an image with a wide dynamic range can be realized based on one photographed image.

REFERENCE SIGNS LIST 10 luminosity threshold level
11 high luminosity region
12 low luminosity region
101 optical lens
102 imaging device
103 signal processing unit
105 control unit
201 pixel portion
202 calculating unit
211 pixel information combining unit
251 high sensitivity pixel information
252 low sensitivity pixel information
300 imaging device
301 pixel portion
302 output selection unit
303 calculating unit
321 comparator
322 counter
323 determining unit
311 pixel information combining unit
351 high sensitivity pixel information
352 low sensitivity pixel information
400 imaging device
401 pixel portion
402 calculating unit
411 pixel information combining unit
412 gradation conversion unit
451 high sensitivity pixel information
452 low sensitivity pixel information
500 imaging device
501 pixel portion
502 calculating unit
511 pixel information combining unit 512 gradation conversion unit
513 signal processing unit
514 codec
520 control unit
551 high sensitivity pixel information
552 low sensitivity pixel information

The invention claimed is:

1. An image processing device, comprising:
a control unit configured to control an exposure time of pixel regions by setting exposure start times for the pixel regions in accordance with different exposure times of the pixel regions;
a pixel portion configured to output pixel information including high sensitivity pixel information from pixel regions of long exposure times and low sensitivity pixel information from pixel regions of short exposure times; and
a pixel information combining unit configured to set weighting coefficients for the high sensitivity pixel information from the pixel regions of long exposure times and for the low sensitivity pixel information from the pixel regions of short exposure times based on a brightness of a photographic subject, and to calculate a pixel value for one or more pixels of an output image based on the weighting coefficients, the high sensitivity pixel information from the pixel regions of long exposure times, and the low sensitivity pixel information from the pixel regions of short exposure times.

2. The image processing device according to claim 1, wherein the exposure time of pixel regions is controlled in units of rows of the pixel portion, and
wherein the pixel portion outputs pixel information with different exposure times from a plurality of different rows.

3. The image processing device according to claim 1, wherein a sum of the weighting coefficients for the high sensitivity pixel information from the pixel regions of long exposure times and the low sensitivity pixel information from the pixel regions of short exposure times equals a predefined value.

4. The image processing device according to claim 3, wherein when the high sensitivity pixel information from the pixel regions of long exposure times is at or above a predetermined threshold, the pixel information combining unit sets the weighting coefficients of the high sensitivity pixel information from the pixel regions of long exposure times to zero or a small number.

5. The image processing device according to claim 3, wherein when the low sensitivity pixel information from the pixel regions of short exposure times is below a predetermined threshold, the pixel information combining unit sets the weighting coefficients of the low sensitivity pixel information from the pixel regions of short exposure times to zero or a small number.

6. The image processing device according to claim 3, wherein when the low sensitivity pixel information from the pixel regions of short exposure times is at or above a predetermined threshold, the pixel information combining unit sets the weighting coefficients of the high sensitivity pixel information from the pixel regions of long exposure times to zero or a small number.

7. The image processing device according to claim 3, wherein the control unit is configured to set the exposure time of pixel regions of long exposure times and the exposure time of pixel regions of short exposure times in units of two rows of the pixel portion, and wherein the pixel information combining unit calculates the pixel value for the one or more pixels of the output image based on a plurality of pixel information from both the high sensitivity pixel information from the pixel regions of long exposure times and the low sensitivity pixel information from the pixel regions of short exposure times.

8. The image processing device according to claim 1, wherein the control unit is configured to control the exposure time in units of rows by controlling a shutter in units of rows of the pixel portion.

9. The image processing device according to claim 1, wherein the control unit is configured to control the exposure time in units of color by controlling a shutter in units of color of the pixel portion.

10. The image processing device according to claim 1, wherein the pixel portion is configured to output pixel information including medium sensitivity pixel information from pixel regions of medium exposure times having exposure times between the long exposure times and the short exposure times, and the pixel information combining unit is configured to set weighting coefficients for the medium sensitivity pixel information from the pixel regions of medium exposure times, and to calculate the pixel value for the one or more pixels of the output image based on the weighting coefficients, the high sensitivity pixel information from the pixel regions of long exposure times, the medium sensitivity pixel information from the pixel regions of medium exposure times, and the low sensitivity pixel information from the pixel regions of short exposure times.

11. The image processing device according to claim 1, further comprising a gradation conversion unit configured to reduce a number of bits of the pixel values for one or more output images.

12. The image processing device according to claim 1, further comprising a signal processing unit configured to process one or more output images generated from the pixel information combining unit.

13. The image processing device according to claim 1, further comprising a codec configured to encode output images generated by the pixel information combining unit.

14. The image processing device according to claim 1, wherein the pixel portion has a configuration in which pixel information with different exposure times of the same color is output from pixel regions that are at least 3×3 pixels.

15. The image processing device according to claim 1, wherein the pixel portion includes a Bayer array or an RGBW array.

16. An imaging device, comprising:
an imaging unit; and
the image processing device according to any one of claims 1-9 and 10-15.

17. An image processing method executed by an image processing device, the method comprising:
controlling an exposure time of pixel regions by setting exposure start times for the pixel regions in accordance with different exposure times of the pixel regions;
outputting pixel information including high sensitivity pixel information from pixel regions of long exposure times and low sensitivity pixel information from pixel regions of short exposure times;
setting weighting coefficients for the high sensitivity pixel information from the pixel regions of long exposure times and for the low sensitivity pixel information from the pixel regions of short exposure times based on a brightness of a photographic subject; and calculating a pixel value for one or more pixels of an output image based on the weighting coefficients, the high sensitivity pixel information from the pixel regions of long exposure times, and the low sensitivity pixel information from the pixel regions of short exposure times.

18. A non-transitory computer-readable storage medium storing a program for executing the image processing method of claim 17.

19. An image processing device, comprising:
   a control unit that controls an exposure time of pixel regions by setting exposure start times for the pixel regions in accordance with different exposure times of the pixel regions;
   a pixel portion that outputs pixel information including high sensitivity pixel information from pixel regions of long exposure times and low sensitivity pixel information from pixel regions of short exposure times; and
   a pixel information combining unit that sets weighting coefficients for the high sensitivity pixel information from the pixel regions of long exposure times and for the low sensitivity pixel information from the pixel regions of short exposure times based on a brightness of a photographic subject, and calculates a pixel value for one or more pixels of an output image based on the weighting coefficients, the high sensitivity pixel information from the pixel regions of long exposure times, and the low sensitivity pixel information from the pixel regions of short exposure times.

20. The image processing device according to claim 19, wherein a sum of the weighting coefficients for the high sensitivity pixel information from the pixel regions of long exposure times and the low sensitivity pixel information from the pixel regions of short exposure times equals a predefined value.

21. The image processing device according to claim 20, wherein,
   when the high sensitivity pixel information from the pixel regions of long exposure times is at or above a predetermined threshold, the pixel information combining unit sets the weighting coefficients of the high sensitivity pixel information from the pixel regions of long exposure times to zero or a small number, and
   when the low sensitivity pixel information from the pixel regions of short exposure times is below a predetermined threshold, the pixel information combining unit sets the weighting coefficients of the low sensitivity pixel information from the pixel regions of short exposure times to zero or a small number.

* * * * *